US008769011B2

(12) United States Patent (10) Patent No.: US 8,769,011 B2
Baird et al. (45) Date of Patent: Jul. 1, 2014

(54) SURVIVABLE BROWSING IN VIRTUALIZED DESKTOP ENVIRONMENT WHEN HOST CONNECTIVITY IS LOST

(75) Inventors: Randall B. Baird, Austin, TX (US); Stephan E. Friedl, Frederick, CO (US); Thomas M. Wesselman, Issaquah, WA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 13/164,858

(22) Filed: Jun. 21, 2011

(65) Prior Publication Data

US 2012/0331406 A1 Dec. 27, 2012

(51) Int. Cl.
 *G06F 15/16* (2006.01)
(52) U.S. Cl.
 USPC ........................................................ 709/204
(58) Field of Classification Search
 USPC ........................................................ 709/204
 See application file for complete search history.

(56) References Cited

U.S. PATENT DOCUMENTS

| 6,389,462 | B1 * | 5/2002 | Cohen et al. ................ | 709/218 |
| 7,568,056 | B2 | 7/2009 | Danilak | |
| 8,239,773 | B1 * | 8/2012 | Billman ...................... | 715/751 |

| 2004/0216124 | A1 * | 10/2004 | Vadella et al. ............. | 719/310 |
| 2006/0104259 | A1 | 5/2006 | Caballero-McCann et al. | |
| 2007/0116246 | A1 | 5/2007 | Walker et al. | |
| 2010/0138744 | A1 | 6/2010 | Kamay et al. | |

OTHER PUBLICATIONS

Cisco Data Sheet, "Cisco Unified Survivable Remote Site Telephone Version 4.1," 2008.
Greenberg, et al., "Adaptive Offloading for Pervasive Computing," IEEE Pervasive Computing, vol. 3, No. 3, Jul.-Sep. 2004, pp. 66-73.

* cited by examiner

*Primary Examiner* — Jason Gee
(74) *Attorney, Agent, or Firm* — Edell, Shapiro & Finnan, LLC

(57) ABSTRACT

Techniques are provided herein for providing survivable browsing when a client endpoint device loses contact with its host server. A Hosted Virtual Desktop (HVD) draws and communicates an HVD display image comprising a HVD browser window to the client endpoint device for display, via a virtual desktop interface (VDI) protocol. A browser (or browser extension) on the HVD works together with a browser server on the client endpoint device to synchronize browser data, and in some examples to render data such as streaming media in a client-provided frameless browser window in place of a placeholder in the HVD browser window. In response to the detection of an inactive VDI session, the browser server on the client endpoint device launches an endpoint browser instance to seamlessly switch browsing from the HVD browser window to an endpoint browser window, using the browser synchronization data.

25 Claims, 24 Drawing Sheets

SURVIVABLE BROWSING IN VIRTUALIZED DESKTOP ENVIRONMENT WHEN HOST CONNECTIVITY IS LOST

CROSS-REFERENCE TO RELATED APPLICATION

The present application is related to U.S. patent application Ser. No. 13/154,558, entitled "Distributed Overlay Browser for Transparent Streaming Media Support in Virtualized Desktop Environment" and filed on Jun. 7, 2011, which is herein incorporated by reference in its entirety. This related application is referred to hereafter as the "Related Application."

TECHNICAL FIELD

The present disclosure relates generally to virtualized desktop environments and more particularly to providing survivable browsing when a client endpoint device loses contact with its host server.

BACKGROUND

Web browsing is an increasingly popular activity in business and personal settings, and with the growth of network-connected devices such as personal computers, web-capable mobile phones and tablets has come increased demand for the provision of media over the web. For example, users may desire to conduct web-based audio and video conferencing, buy or rent movies or television shows over the web, view video or animation encoded for Adobe Flash, listen to streaming radio stations, or even play games with users around the world via the Internet.

When virtual or cloud-based desktops are used, web browsing may be virtualized along with other hosted applications. That is, a browser application may run in a hosted virtual desktop (HVD), or run as a hosted virtual application (HVA) while the browser window is displayed to a user on a remote client endpoint device such as a computer or mobile phone. If the connectivity between a client endpoint device and the host server is lost, then browsing will be disrupted, leading to losses of productivity.

DESCRIPTION OF EXAMPLE EMBODIMENTS

Overview

Techniques are provided herein for providing survivable browsing when a client endpoint device loses contact with its host server. A web browser on a Hosted Virtual Desktop (HVD) draws an HVD display image comprising an HVD browser window and communicates it to the client endpoint device for display, via a virtual desktop interface (VDI) protocol. The HVD browser window comprises zero or more host-provided window elements such as a window frame and may also comprise at least one placeholder where a client-provided frameless browser window may be rendered. A browser (or browser extension) on the HVD works together with a browser server on the client endpoint device to synchronize browser data, and in some examples to render data such as streaming media in a client-provided frameless browser window in place of the placeholder, before displaying the frameless browser window and the HVD display as an integrated display at the client endpoint device. In response to the detection of an inactive VDI session, for example due to a failure to maintain the VDI session, the browser server on the client endpoint device launches an endpoint browser instance to seamlessly switch browsing from the HVD browser window to an endpoint browser window, using the browser synchronization data.

Example Embodiments

Figure 1:
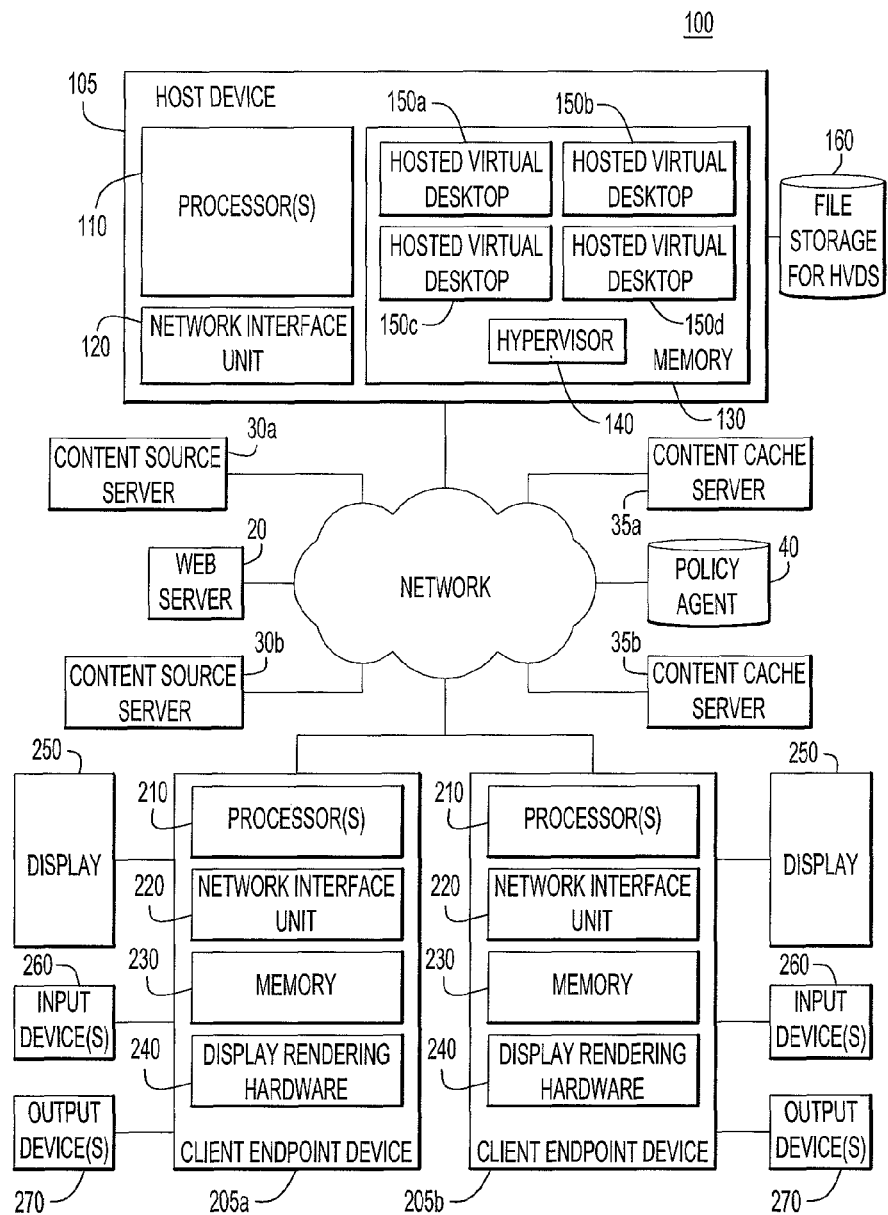
FIG. 1 is an example of a block diagram showing a virtual desktop interface (VDI) environment in which VDI connectivity can be established between client endpoint devices and one or more hosted virtual desktops.

Referring now to the Figures, an example of a block diagram showing a VDI environment in which VDI connectivity can be established between client endpoint devices and one or more hosted virtual desktops is shown in FIG. 1. The depicted VDI environment 100 includes host device 105, client endpoint devices 205a, 205b, web server 20, content servers 30a, 30b, content distribution cache servers 35a, 35b, and policy agent 40 which are connected over network 10 to each other. The VDI environment may include additional servers, clients, and other devices not shown, and individual components of the system may occur either singly or in multiples, for example, there may be more than one host device 105, and other networking components, e.g., routers and switches, may be used in the VDI environment 100. Similarly, web server 20, content servers 30a, 30b, and content cache servers 35a, 35b may be embodied in a single device.

Network 10 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the VDI environment 100 may include any conventional or other communications devices to communicate over the networks via any conventional or other protocols, and may utilize any type of connection (e.g., wired, wireless, etc.) for access to the network.

Web server 20 is a conventional or other server for serving web pages including Hypertext Markup Language (HTML) documents and other content such as images or style sheets to a web browser. Content source servers 30a, 30b are conventional or other servers for serving data to a client or a content distribution cache server, e.g., a Darwin Streaming Server, Flash Media Server, Unreal Media Server, or the like. The content servers may provide any type of data, for example media such as streaming video and/or streaming audio, games or simulations, animations, scripts, or the like. Content data may be encapsulated as HTML or XHTML documents, or may be represented in a non-HTML format. Content cache servers 35a-b, e.g. Cisco Wide Area Application Engine (WAE) servers running the Application and Content Network System (ACNS), act as intermediate repositories for content received from content servers 30a-b. As is further described with respect to FIG. 3, some examples of the present embodiments transport data directly from content source servers 30 and/or content cache servers 35 to the client endpoint devices 205, without the data passing through the host device 105. By placing cache servers 35 at key points in network 10 and caching content (e.g., media content) from a content source server 30a-b, client endpoint 205a may receive content from the cache servers 35 instead of the content source 30, thereby reducing bandwidth consumption over the core portions of network 10 and reducing streaming latency. It is understood that many types of content servers 30 and distribution caches 35 stream media to clients; however, any type of content may be streamed.

Policy agent 40 may be a separate network service as is depicted in FIG. 1, or it may reside locally on host device 105 (e.g., in hosted virtual desktops 150 or as a separate resident of memory 130) and client devices 205. As is further described with respect to FIGS. 9, 11 and 12, when the policy agent 40 is presented with a Uniform Resource Locator (URL), (e.g., via a query), it applies one or more policies to report (e.g., via a query response) whether the URL should be rendered on the HVD 150 or the client endpoint device 205. Further details of the operation of the policy agent 40 are set forth in the Related Application.

Host device 105 comprises one or more processors 110, a network interface unit 120, and memory 130. The processor 110 is, for example, a data processing device such as a microprocessor, microcontroller, system on a chip (SOC), or other fixed or programmable logic, that executes instructions for process logic stored in memory 130. The network interface unit 120 enables communication throughout the VDI environment, as shown in FIGS. 1 through 3. Memory 130 may be implemented by any conventional or other memory or storage device, and may include any suitable storage capacity. For example, memory 130 may comprise read only memory (ROM), random access memory (RAM), erasable programmable read only memory (EPROM), magnetic disk storage media devices, optical storage media devices, flash memory devices, electrical, optical, or other physical/tangible memory storage devices. The memory 130 may comprise one or more computer readable storage media (e.g., a memory device) encoded with software comprising computer executable instructions and when the software is executed (by processor 110) it is operable to perform the operations described herein in connection with FIGS. 2-7, 10 and 12.

The host device 105 may be, for example, a computing blade, a blade server comprising one or more solid state drives, or a blade center comprising one or more blade servers together with a blade chassis comprising common resources such as networking connections, input/output device connections, power connections, cooling devices, switches, etc. The host device 105 may be a component of a larger system, such as a Cisco Unified Computing System, or a data center that centralizes enterprise computing resources.

Resident in memory 130 are hypervisor 140, and multiple hosted virtual desktops (HVDs) 150a-d. The hypervisor or virtual machine monitor 140 presents a virtual operating platform to the HVDs 150a-d, and manages access to the host processor 110, network interface unit 120, memory 130 and other host resources, so that the HVDs 150a-d have access to appropriate host resources without disrupting each other's operation. Each HVD 150 operates independently of the other HVDs 150 and runs as a separate virtual machine on the host device 105, and each HVD 150 may run a different operating system if desired. Further operation of the HVDs is explained below with reference to FIGS. 2-13.

Attached to host device 105 is file storage 160 for HVDs 150. File storage 160 may be implemented by any conventional or other memory or storage device, and may include any suitable storage capacity. For example, file storage 160 may comprise ROM, RAM, erasable EPROM, magnetic disk storage media devices, optical storage media devices, flash memory devices, electrical, optical, or other physical/tangible memory storage devices. In an example embodiment, the file storage 160 is a Redundant Array of Independent (or Inexpensive) Disks (RAID), and in a different example embodiment, the file storage 160 is a Storage Area Network (SAN). Each HVD may have mounted a private volume that references an area of file storage 160, and may also have mounted areas of file storage 160 that are public volumes or volumes shared across more than one HVD.

Each example client endpoint device 205*a* comprises one or more processors 210, a network interface unit 220, memory 230, and display rendering hardware 240. The processor 210 is, for example, a data processing device such as a microprocessor, microcontroller, system on a chip (SOC), or other fixed or programmable logic, that executes instructions for process logic stored in memory 230. The network interface unit 220 enables communication throughout the VDI environment, as shown in FIGS. 1 through 3. Memory 230 may be implemented by any conventional or other memory or storage device, and may include any suitable storage capacity. For example, memory 230 may comprise ROM, RAM, EPROM, magnetic disk storage media devices, optical storage media devices, flash memory devices, electrical, optical, or other physical/tangible memory storage devices. The memory 230 may comprise one or more computer readable storage media (e.g., a memory device) encoded with software comprising computer executable instructions and when the software is executed (by processor 210) it is operable to perform the operations described herein in connection with FIGS. 2-9 and 13. Display rendering hardware 240 may be a part of processor 210, or may be, e.g., a separate graphics processor, e.g., a Graphics Processor Unit (GPU).

The example client endpoint device 205 may be any conventional or other computer system or device, such as a thin client, computer terminal or workstation, personal desktop computer, laptop or netbook, tablet, mobile phone, set-top box, networked television, or other device capable of acting as a client in the described VDI environment.

The example client endpoint device 205 interfaces with display device 250, input device(s) 260, and output device(s) 270, and communicates with these devices in any suitable fashion, e.g., via a wired or wireless connection. The display device 250 may be any suitable display, screen or monitor capable of displaying information to a user of a client endpoint device, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like. The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

The functions of the processors 110 and 210 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 130 and 230 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 2 through 13, for example, may be implemented with fixed logic or programmable logic (e.g., software or computer instructions executed by a processor or field programmable gate array (FPGA)).

Figure 2A:
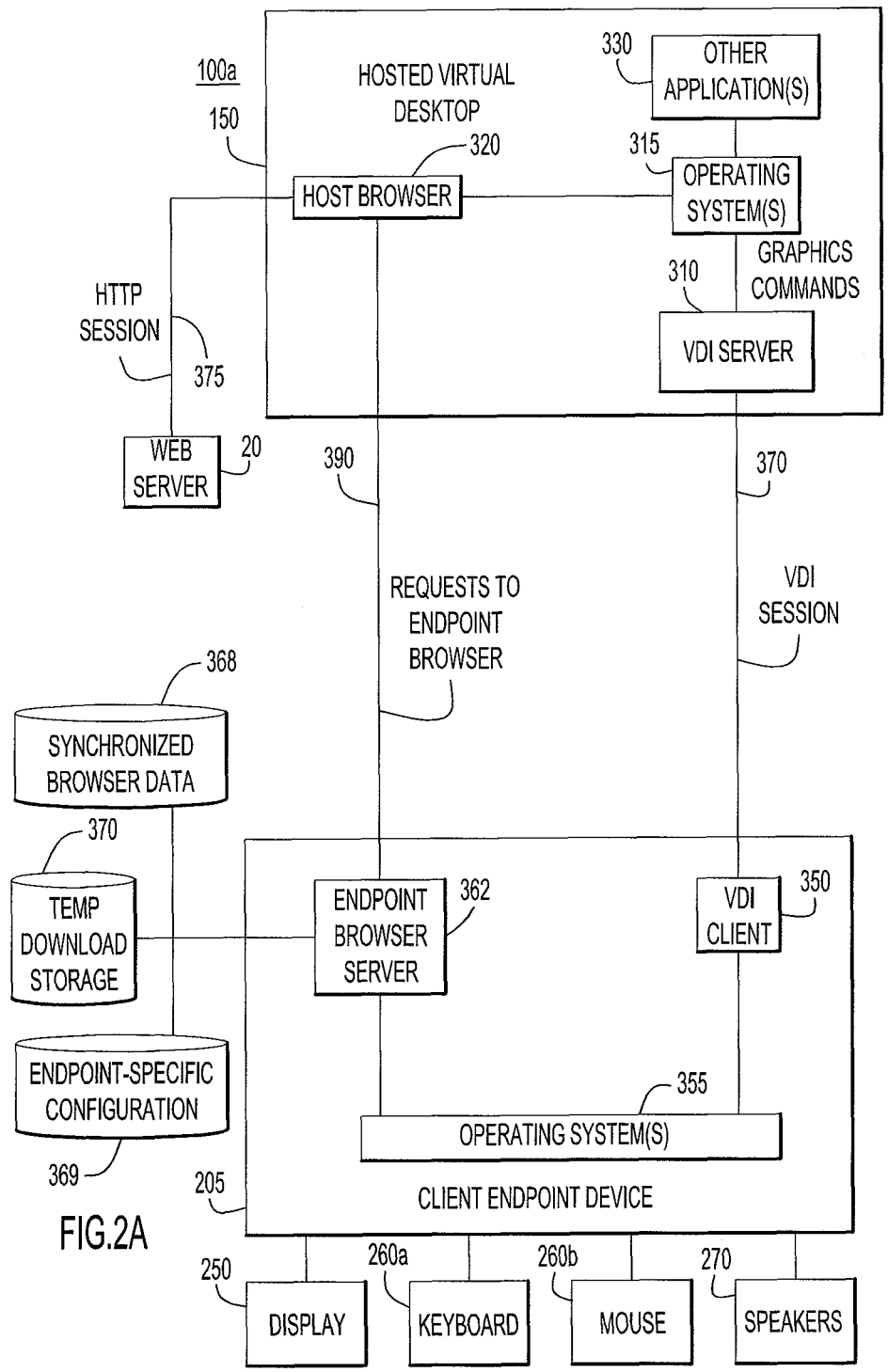
FIGS. 2A and 2B are examples of block diagrams showing VDI, HTTP, and browser communication sessions among a particular hosted virtual desktop (HVD), client endpoint device, and web server in the VDI environment before (FIG. 2A) and after (FIG. 2B) the connection between the HVD and client endpoint is lost.
Figure 2B:
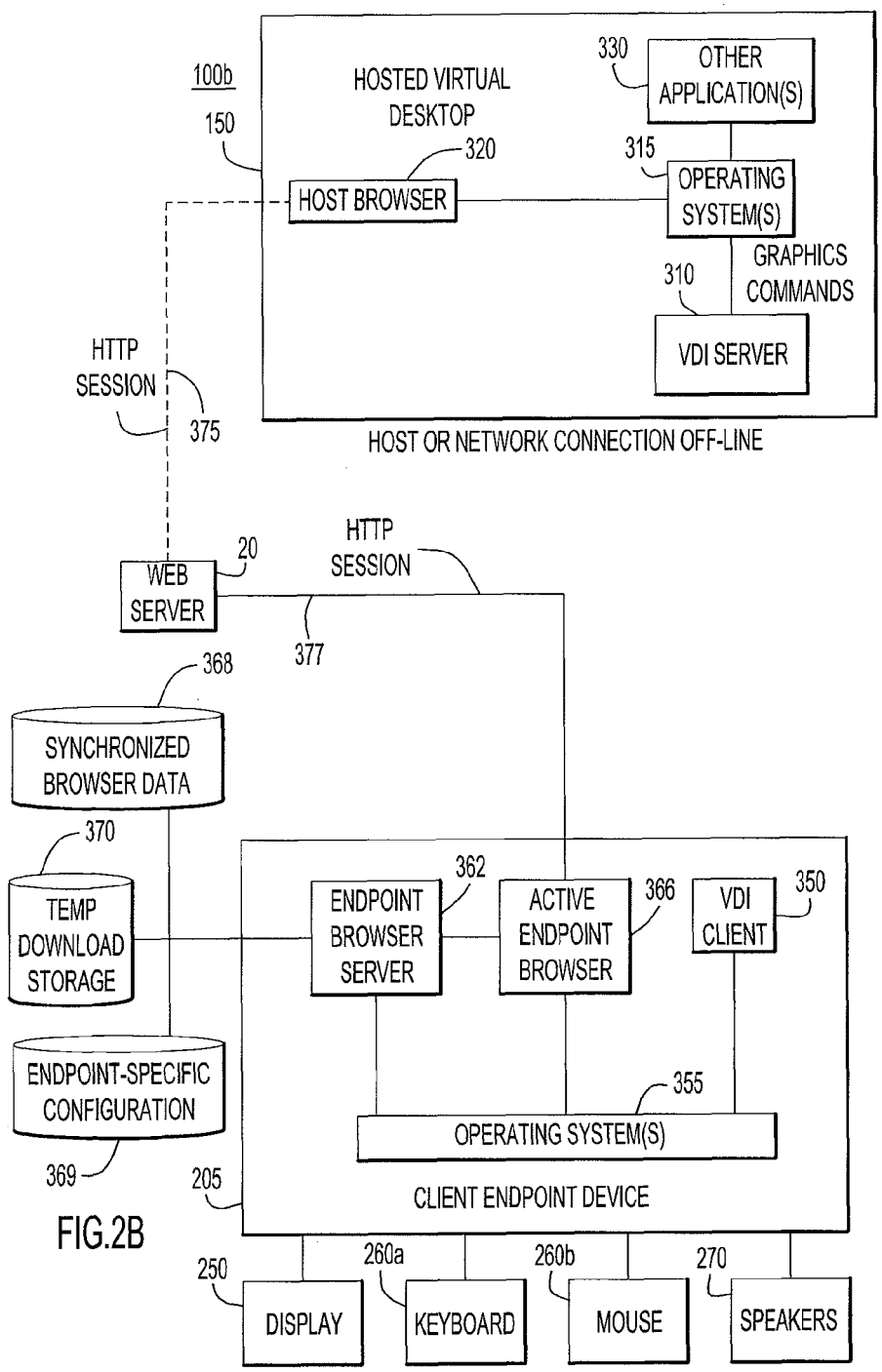
Figure 3A:
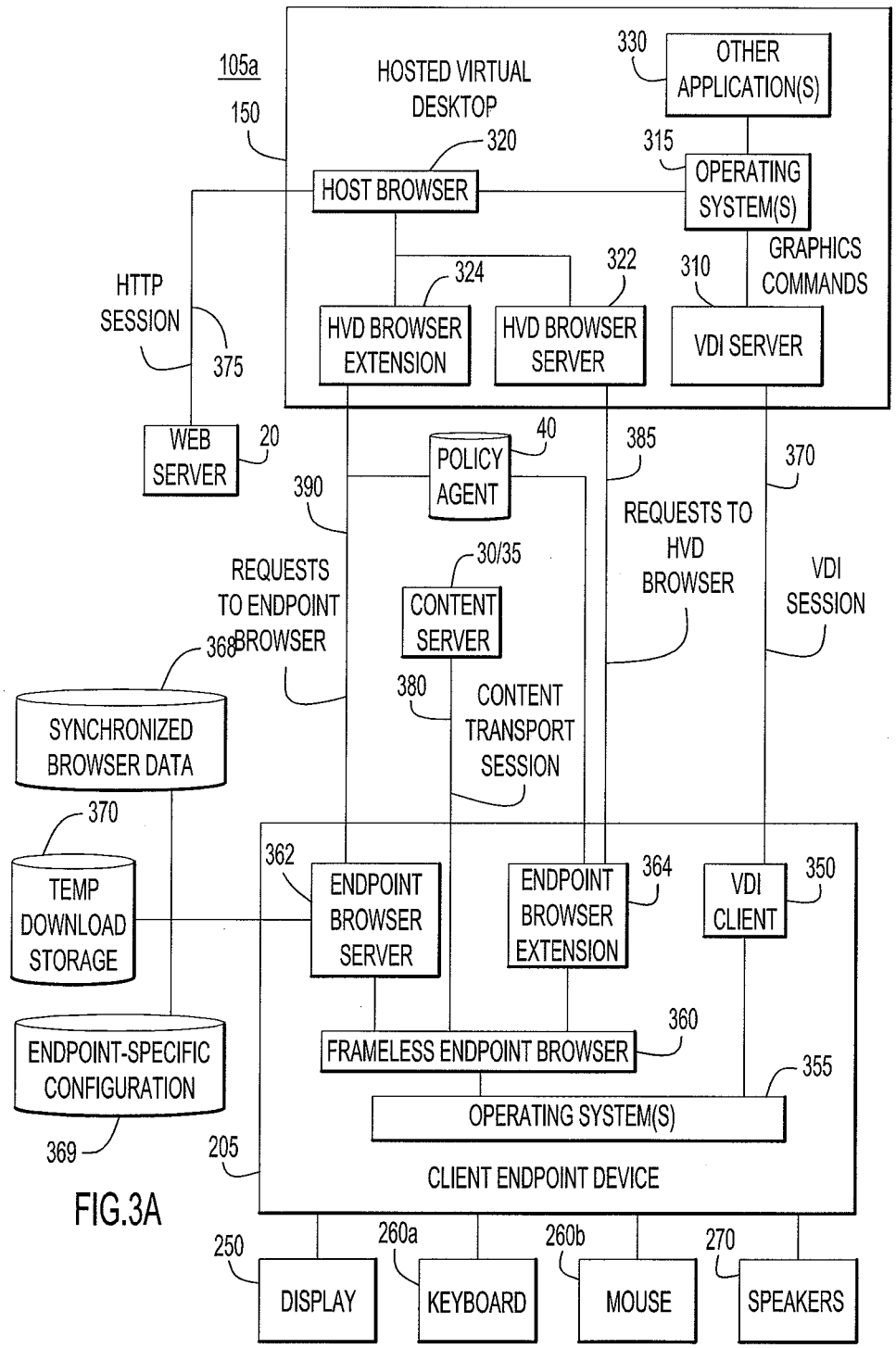
FIGS. 3A and 3B are examples of block diagrams showing VDI, HTTP for multiple browser tabs or windows, and browser communication sessions among a particular hosted virtual desktop (HVD), client endpoint device, web server and content server in the VDI environment before (FIG. 3A) and after (FIG. 3B) the connection between the HVD and client endpoint is lost.
Figure 3B:
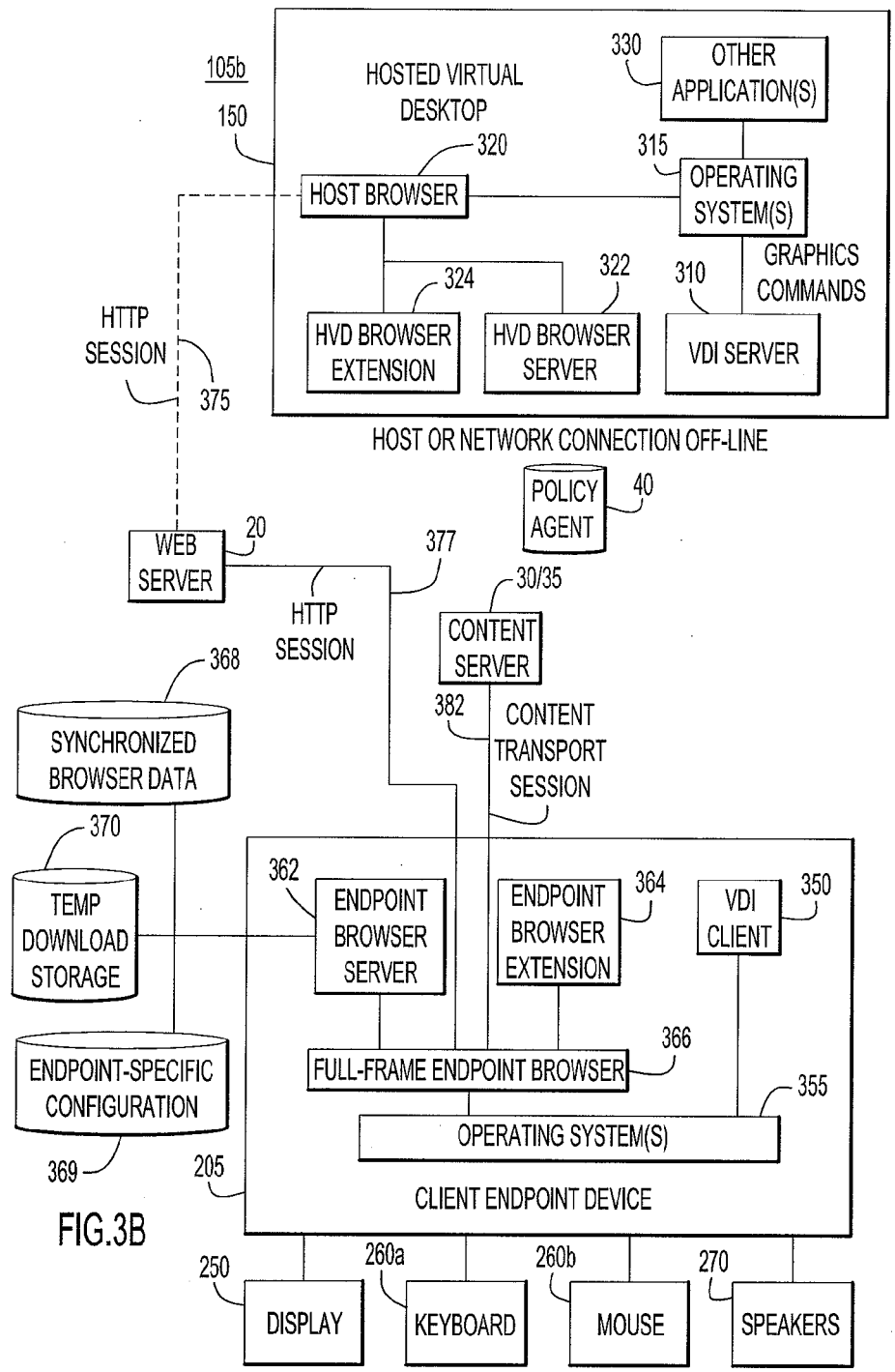

FIGS. 2 and 3 depict two different examples of VDI environments in which the present embodiments may be implemented. Both examples are depicted by block diagrams showing virtual desktop interface (VDI), browser communication, Hypertext Transfer Protocol (HTTP) sessions among HVD 150, client endpoint device 205, and web server 20 in the VDI environment 100. In the example of FIG. 3, a content transport session between the client endpoint device 205 and content server 30 or 35 is also shown. For each example, the first figure (FIGS. 2A and 3A) depicts the VDI environment when a connection between the HVD and client endpoint is present (the VDI session is active), and the second figure (FIGS. 2B and 3B) depicts the VDI environment when the connection between the HVD and client endpoint has been lost (the VDI session is inactive).

For purposes of simplification, the other components of the VDI environment 100, e.g., other client endpoint devices, are not shown here in FIG. 2 or 3. Further, although the description refers to the interaction between one HVD 150 and one client endpoint device 205, it is understood by those skilled in the art that each HVD 150 may interact with one or more client endpoint devices 205, and each client endpoint device 205 may interact with one or more HVDs 150 on a single or multiple host devices 105. Moreover, there may be more than one web server 20 and more than one content server 30 or 35 in the VDI environment 100, and therefore more than one HTTP session 375, 377, etc.

As can be seen in FIGS. 2 and 3, the example HVD 150 comprises a VDI server 310, host operating system(s) 315, hosted web browser 320 (also referred to as "host web browser" or "HVD web browser"), and may also comprise one or more other application(s) 330. In the example of FIG. 3A, an HVD browser server 322 and HVD browser extension 324 are associated with the host web browser 320. The example client endpoint device 205 comprises a VDI client 350, operating system(s) 355, and an endpoint browser server 362, all of which reside in memory 230 (as shown in FIG. 1), as well as display 250, input devices including keyboard 260*a* and mouse 260*b*, and output devices including speakers 270. In some examples, such as the example depicted in FIG. 3A, the client endpoint device 205 may further comprise one or both of a frameless endpoint browser 360 and an endpoint browser extension 364, which are also resident in memory 230.

In VDI environments in which the sessions between the HVD and client endpoint have been lost, for example the examples of FIGS. 2B and 3B, an active endpoint browser 366 (also called a "full-frame endpoint browser") is resident in memory. The host web browser 320, the frameless endpoint browser 360 and the endpoint browser 366 may be any browser software capable of use in conjunction with the host operating system 315, for example Mozilla Firefox, Google Chrome, Microsoft Internet Explorer, Opera Software Opera, Apple Safari, etc.

FIG. 2 illustrates an example in which neither browser 320, 366 is associated with a browser extension, and no host browser server 322 is present, and FIG. 3 illustrates an example in which each browser 320, 360 (or 366) is associated with a browser extension 324, 364, and a host browser server 322 is present. These examples are not limiting, and it should be understood that one or both browsers 320, 360 (or 366) may be associated with a browser extension. The following description is applicable to both FIGS. 2 and 3 unless noted otherwise, with the understanding that when the functionality of the browser extensions 324, 364 is referred to, it is understood that such functionality in the example of FIG. 2 is performed by one or both of the HVD browser 320 and the combination of the endpoint browser 366 and its browser server 362. Similarly, when the functionality of the host browser server 322 is referred to, but the server is not present (e.g., in the example of FIG. 2), then such functionality is performed by the HVD browser 320 and/or the host browser extension 324 (if present).

The browser servers 322, 362 (also called browser masters or browser services) and browser extensions 324, 364 may each be, for example, a software module or an element of a software module, and may be, for example, a stand-alone module, a part of another software module, or a combination of both. For example, the HVD browser server 322 and HVD browser extension 324 may each be individual software modules (as depicted in FIG. 3A), or may be combined together into a software module, or one or both may be combined together with host browser 320. Similarly, the endpoint browser server 362 and endpoint browser extension 364 may each be individual software modules (as depicted in FIG. 3A), or may be combined together into a software module, or one or both may be combined together with endpoint browser 360/366. Generally, when host browser 320 is instantiated, HVD browser extension 324 (if present) and HVD browser server 322 are also instantiated. In another embodiment, browsers 320, 360, may be implemented so that the functionality expressed by browser extensions 324, 364 is executed natively by the browsers (e.g., as depicted in FIG. 2A).

The client endpoint device 205 is connected to three storage areas, a synchronized browser data storage area 368, an endpoint-specific configuration data storage area 369, and a temporary download storage area 370. The synchronized browser data stored in storage area 368 comprises one or more of data describing the currently open browser tabs and windows, browser preferences data, bookmark data, cookie data, certificate data, user profile configuration data, or browser history data, and configuration data. The configuration data comprises one or more of proxy settings, home page data, where to send downloads, which add-ons and plugins to support, whether to open new content in tabs or windows, pop-up blockers, javascript enable/disable settings, in-line image loading, default fonts, language, MIME-to-app and MIME-to-plugin mapping, history on/off, control of plugin installation, remembering passwords, scrolling options, page cache control, whether to auto-update the browser and add-ons, use of SSL/TLS, and certificate management settings. Endpoint-specific configuration data stored in storage area 369 comprises a subset of the configuration data stored in storage area 368, for example, proxy settings or data that enable the endpoint browser 360, 366 to operate when a client endpoint device loses contact with its host server, and that are different from the configuration data applicable when a VDI session is active. The synchronized browser data including the configuration data is synchronized between the endpoint device 205 and the host 150, and when received by the endpoint device 205 is stored in synchronized browser data area 368, so that the browser information remains up-to-date in the event of a VDI failure.

Temporary download storage area 370 comprises an area where files downloaded by the endpoint browser 366 may be saved when the client endpoint device loses contact with its host server, e.g., during a VDI outage. Data storage areas 368, 369, 370 may be implemented by any conventional or other memory or storage device, and may include any suitable storage capacity. For example, data storage areas 368, 369, 370 may comprise ROM, RAM, EPROM, magnetic disk storage media devices, optical storage media devices, flash memory devices, electrical, optical, or other physical/tangible memory storage devices.

The VDI server 310 interacts with the host operating system 315 to provide virtual desktop interface functionality to the client endpoint device 205 over VDI session 370, which is a VDI protocol link that is established using any suitable VDI protocol, for example Citrix Independent Computing Architecture (ICA), VMWare PC over IP (PCoIP), Microsoft Remote Desktop Protocol (RDP), or other suitable protocol. For example, any application with which a user of the client endpoint device 205 is interacting is hosted by the HVD 150, while the window associated with the application is rendered by the client endpoint device 205. The windows are depicted and further described with reference to FIGS. 4 through 6. The VDI server 310 on the host may, for example, receive HVD display output from the host operating system 315 and send it to the VDI client 350 as an HVD display over VDI session 370. The VDI session may, for example, represent all windows in the HVD display as a single image, or it may indicate the position and size of each host-provided window element and placeholder in the HVD display, and/or the position and size of each client-provided window element and placeholder to be overlaid in the HVD display.

The VDI client 350 interacts with client operating system 355 to render the received HVD display for display on the client endpoint device 205. As will be further described with reference to FIGS. 4 through 6, the frameless endpoint browser 360, endpoint browser server 362 and endpoint browser extension 364 may also modify the received HVD display, for example by rendering a client-provided frameless browser window over a placeholder portion of the HVD display, in the course of rendering it to display 250. The VDI client 350 also receives user input from the user interface, for example, the user types on keyboard 260a or exercises mouse 260b, and these inputs are translated by the VDI client 350 and sent to the VDI server 310 via VDI session 370. After it receives the user input, VDI server 310 translates it into virtual keyboard and mouse inputs, and feeds it via host operating system 315 to host web browser 320 or another application 330, as if the applications and the input devices 260 were running on a single desktop computing device. The user inputs are processed by the appropriate application at the HVD, and HVD display images are generated by the operating system 315 and VDI server 310 for transmission back to the VDI client 350, which renders the HVD display and client-generated user elements for display to the user on display 250.

In another embodiment, host device 105 may execute hosted virtual applications (HVAs), including host browser 320, from its memory 130, rather than full hosted virtual desktops 150. In this embodiment, client endpoint device 205 may use its VDI client 350 to interact with multiple host devices 105, each executing one or more HVAs, and use the client operating system 350 to composite the output of the HVAs to present a full windowed desktop on display 250.

Content to be rendered by the browsers may be communicated directly from a web server 20 as shown in FIG. 2, from a content server 30 or content cache server 35a-b, or from both servers as shown in FIG. 3. For example, FIG. 2A and FIG. 2B depict the communication of web content from web server 20 to host browser 320 via HTTP session 375 (in FIG. 2A) or to endpoint browser 366 via HTTP session 377 (in FIG. 2B) when the host or network connection is off-line, e.g., when the VDI session is inactive. The content may be, for example, an HTML- or XHTML-encoded web page. FIG. 3 illustrates a different example, in which content transport sessions 380, 382 are established directly between the content server 30 or content cache server 35a-b and the frameless endpoint browser 360 (in FIG. 3A) or the full-frame endpoint browser 366 (in FIG. 3B) when the host or network connection is off-line, e.g., when the VDI session is inactive.

In the example embodiment depicted in FIG. 3A, the content (e.g., media) data flows directly to client endpoint device 205, rather than flowing through the HVD 150 and thus requiring a very high bitrate from the VDI session 370 even when the VDI session is active. When the frameless endpoint browser 360 decodes and renders the data, the rendered data is sent to client operating system 355 to be inserted as a frameless browser window on the rest of the HVD display, which is being rendered by VDI client 350. The operation of the frameless browser when the VDI session is active is further described by reference to FIGS. 9 through 13 and their accompanying descriptions, and in the Related Application.

The data transported by content transport sessions 380, 382 may be encoded or compressed in any suitable fashion, and transmitted via any suitable protocol, for example HTTP, Microsoft Media Services (MMS), MPEG-Transport Stream (MPEG-TS), the Real-time Transport Protocol (RTP), User Datagram Protocol (UDP), or any other suitable protocol. In some embodiments, content server 30 or content cache server 35 are HTTP servers and therefore are functionally no different from a web server 20.

The communication session 390 is established between endpoint browser server 362 and its opposing HVD browser extension 324 if present (as depicted in FIG. 3A), or if no browser extensions are present, with the opposing HVD browser 320 (as depicted in FIG. 2A). Similarly, communication session 385 is established between HVD browser server 322 and its opposing endpoint browser extension 364, if present (as depicted in FIG. 3A) or, if no browser extensions are present, with the opposing endpoint browser 360. If HVD browser server 322 is not present, then communication session 385 is established between the HVD browser 320 and opposing endpoint browser extension 364, if present or, if no browser extensions are present, with the opposing endpoint browser 360. The communication sessions 385, 390 may be established using any suitable protocol, for example HTTP, TLS, TCP, or any other suitable protocol. In one embodiment, one or both of the communication sessions 385, 390 are multiplexed into a virtual channel transported by VDI session 370, and in another embodiment one or both of the communication sessions 385, 390 are transported independently from VDI session 370.

The communication sessions 385, 390 may comprise requests to load particular web pages, to instantiate a client frameless endpoint browser 360 instance, to describe the location of one or more placeholder objects over which the frameless endpoint browser 360 should render a particular frameless browser instance, to identify a URL describing the location of the content server 30, 35, to report changes to the page history of frameless endpoint browser 360, to synchronize bookmarks, cookies, certificates, configuration data, and the like, and to display or hide browser tabs or browser windows. This information may be stored in synchronized browser data area 368, so that the browser information remains up-to-date in the event of a VDI failure.

The various operating systems mentioned with reference to FIGS. 1 through 3, such as the host operating system(s) 315 and the client operating system(s) 355 may be any suitable operating system for use in the VDI environment 100, such as, for example, a FreeBSD, Linux, OS X, UNIX, Windows, or other operating system. The operating system may be a standard operating system, an embedded operating system, or a real-time operating system. For example, the host operating system 315 may be a Linux operating system such as Ubuntu or Red Hat Enterprise Linux, a Mac operating system such as OS X or OS X Server, or a Windows operating system such as Windows 7 or Windows Server 2008 R2. The client operating system 355 may be, for example, a Blackberry, Linux, OS X, Windows, or other operating system. In one embodiment, the client operating system 355 is a flavor of Linux, such as Android, MeeGo, ThinStation, Ubuntu, webOS, or the like. In another embodiment, the client operating system 355 is an Apple operating system, such as OS X, iOS, or the like, or a Windows operating system, such as Windows 7, Windows CE, Windows Vista, Windows XP, or Windows XPe. It will be appreciated that the host browser 320 should be compatible with host operating system 315 and that the frameless endpoint browser 360 and active endpoint browser 366 should be compatible with client operating system 355. Hence, host browser 320 and endpoint browsers 360, 366 need not be the same browsers. As long as each browser is capable of rendering data from content server 30 or cache server 35, the user's experience of the rendering should be unaffected.

Depending on the embodiment, there may be no instances of an endpoint browser 360, 366 instantiated on the client endpoint device 205 at some times. For example, in the example of FIG. 2A, browsing is performed by the HVD host so long as the VDI session is active and so no endpoint browser 366 is needed while the VDI session remains active. Similarly, in the example of FIG. 3A, the policy agent 40 may have determined that all current web pages should be rendered in HVD browser tabs and windows, so it is possible that zero instances of frameless endpoint browser 360 may be present on client endpoint device 205 while the VDI session remains active. However, in this case, endpoint browser server 362 should still be present, so that connection requests and synchronization data from HVD browser extension 324 may still be received and so endpoint browser server 362 can create an instance of frameless endpoint browser 360. The frameless endpoint browser 360 generally instantiates the endpoint browser extension 364.

For some embodiments, endpoint browser server 362 should be permanently resident on client endpoint device 205, even if an endpoint browser 360, 366 is not yet instantiated. While session 390 is available, endpoint browser server 362 may receive synchronization data from host browser 320 or host browser extension 324. Then, when an endpoint browser is desired, for example because the VDI session has become inactive, the endpoint browser server 362 may launch an active endpoint browser 366 instance, for example as shown in FIG. 2B. Or, for example, when HVD browser extension 324 notifies endpoint browser server 362 to instantiate a frameless endpoint browser 360 instance when a VDI session is active, for example as shown in FIG. 3A.

Figure 5A:
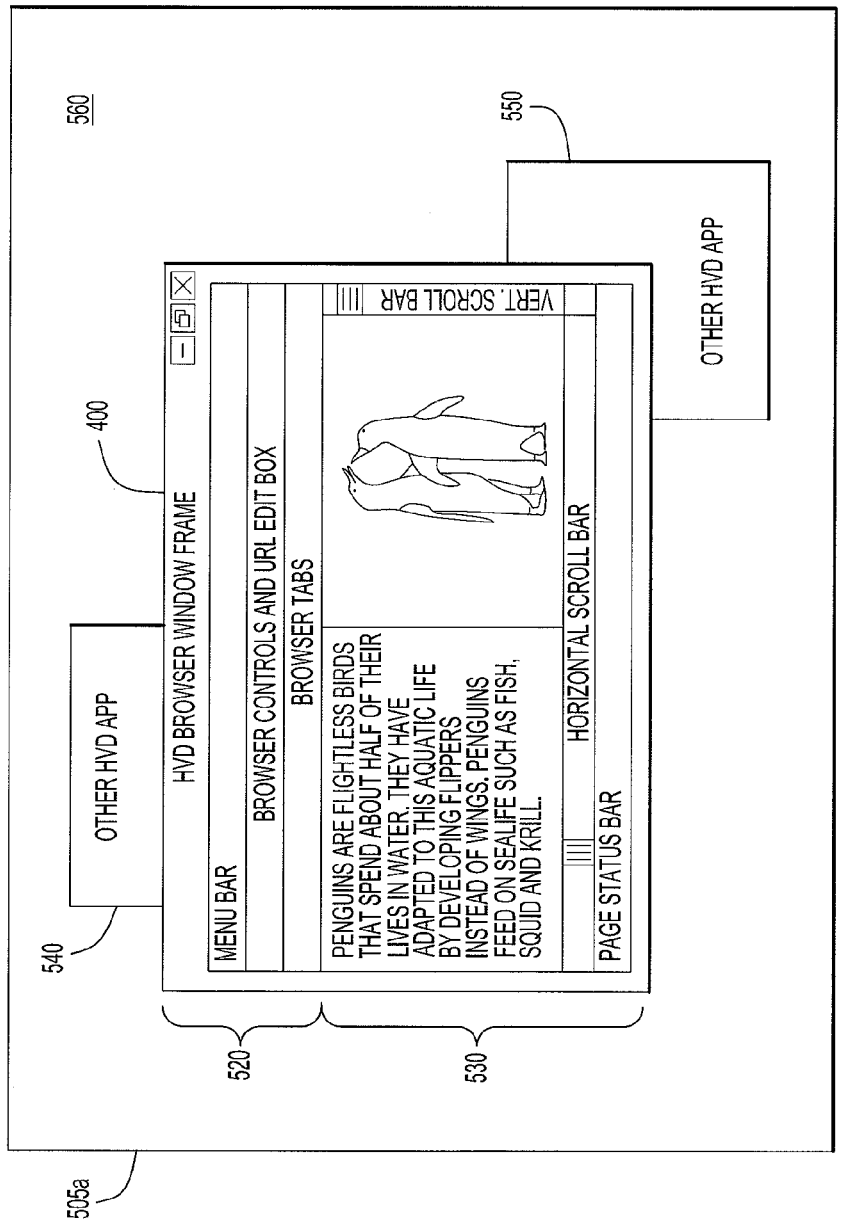
FIG. 5A is an example of a client display including an HVD display comprising a host browser window rendered by a hosted web browser including window elements rendered by the HVD.
Figure 5B:
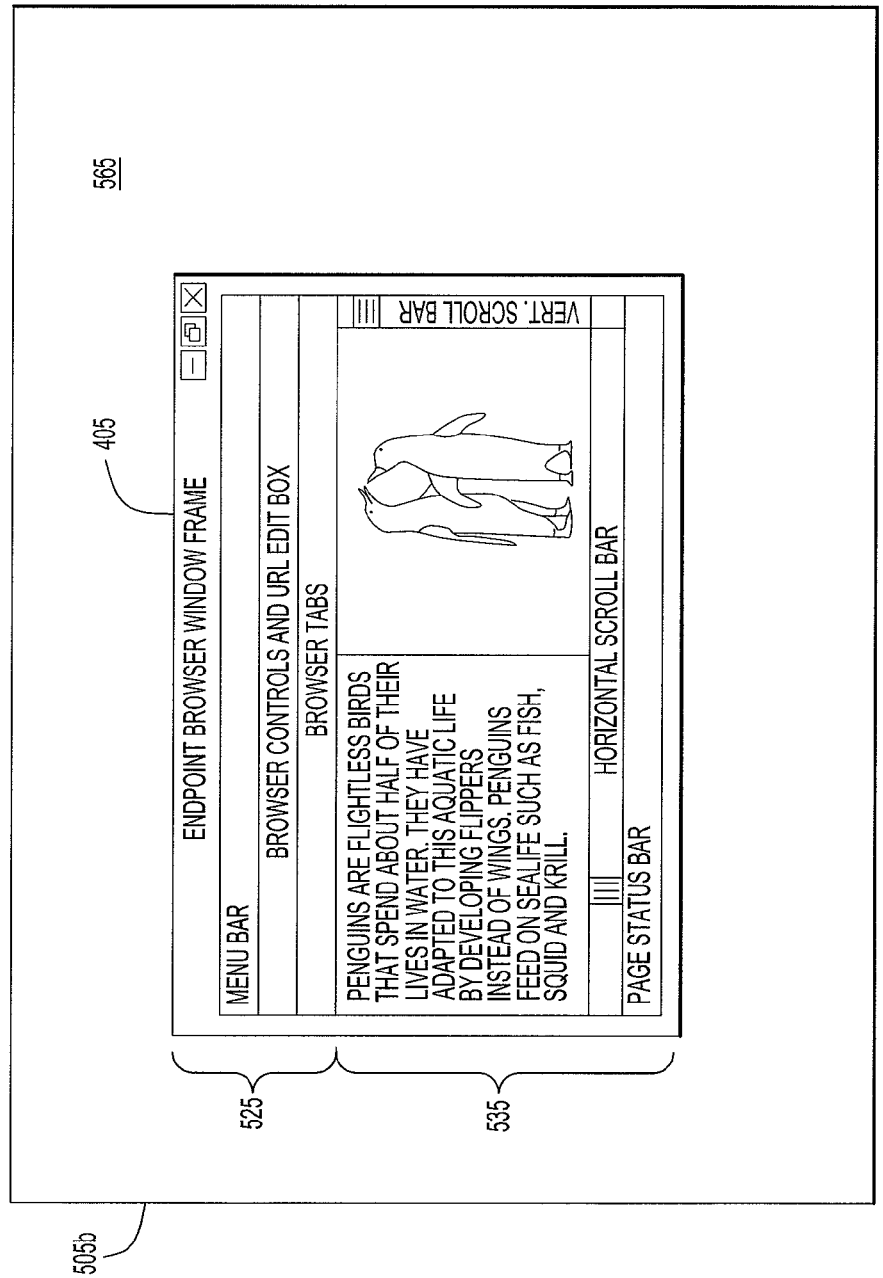
FIG. 5B is an example of a client display including an endpoint browser window rendered by an endpoint browser after the connection between the HVD and client endpoint is lost.

FIG. 2A represents an example embodiment where the VDI session is active, e.g., the host or network connection is online, and the web browsing is handled by the host browser 320. An example client endpoint display produced by the embodiment of FIG. 2A is shown in FIG. 5A. If the VDI session 370 becomes inactive, for example because of a failure to establish or maintain the VDI session, then session 390 is also disrupted. FIG. 2B represents the same embodiment as FIG. 2A, except that the VDI session has become inactive. In FIG. 2B, it can be seen that an active endpoint browser 366 has been launched on the client endpoint device 205, and that this endpoint browser 366 utilizes the browser synchronization data stored in storage area 368 to establish a connection (e.g., HTTP session 377) with the web server 20, so that it can render the same web page(s) that were being rendered by the host browser 320 before the VDI session became inactive. An example client endpoint display produced by the embodiment of FIG. 2B is shown in FIG. 5B. In this manner, a user of the client endpoint device 205 is able to continue browsing with little or no interruption. It will be understood that the events that disrupted communications between HVD 150 and client endpoint 205 may or may not have also disrupted communications between web server 20 and HVD 150. In either event, the ability to continue browsing the web pages exported by web server 20 is predicated upon the ability of client endpoint 205 to establish HTTP session 377 with web server 20.

If or when the VDI session is re-established, for example because a failure to establish or maintain the VDI session has been repaired, then the endpoint browser server 362 sends an update of the browser synchronization data stored in storage area 368 to the HVD host, and in return receives an updated HVD display comprising one or more new HVD browser windows for display to a user of the client endpoint device 205. The endpoint browser server 362 then terminates the endpoint browser instance(s), in order to reestablish the scenario depicted in FIG. 2A.

Figure 6A:
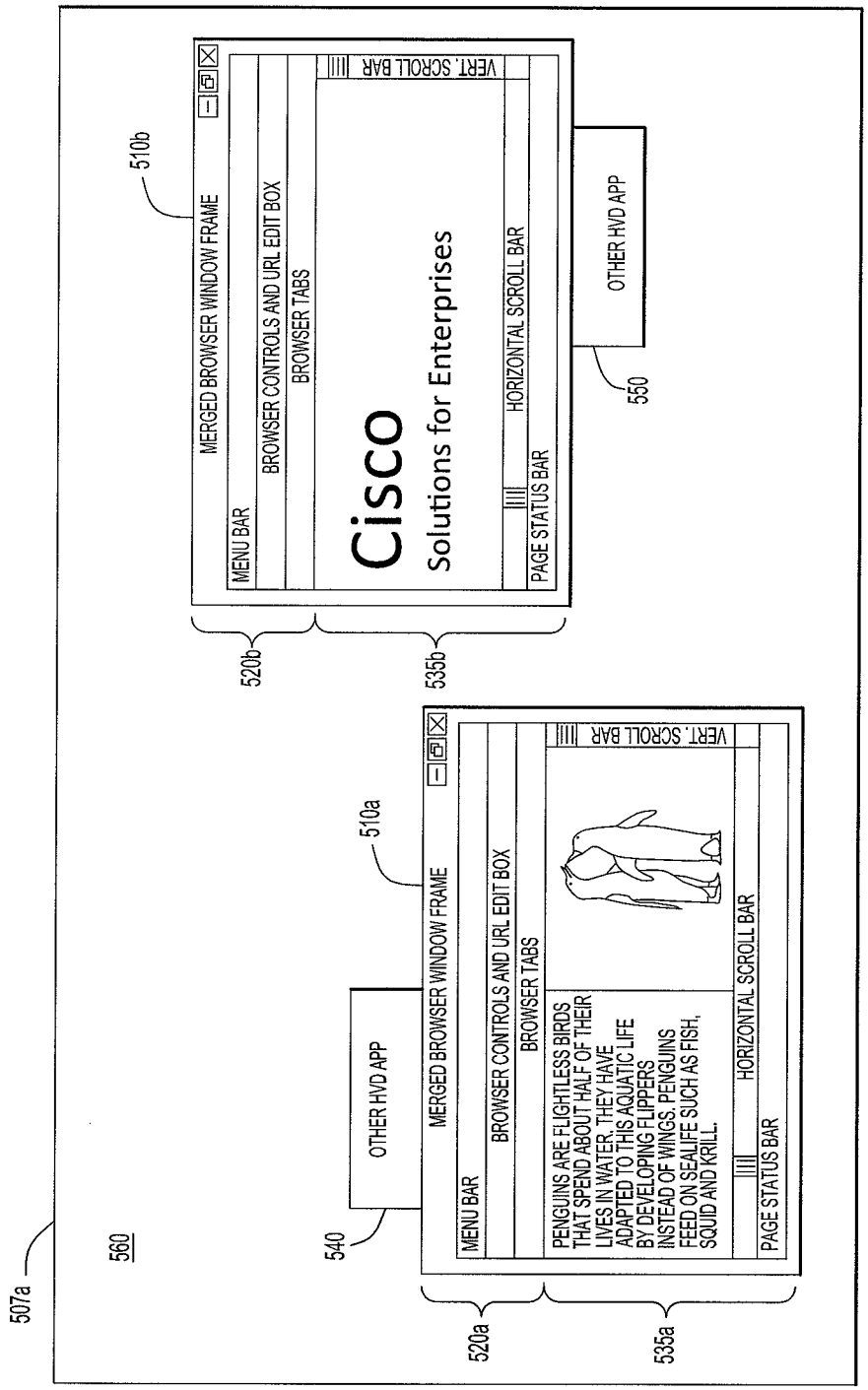
FIG. 6A is an example of a client display including an HVD display comprising two host browser windows, each browser window including window elements rendered by the HVD and a placeholder that has been replaced with a frameless client browser window rendered by the client endpoint device.
Figure 6B:
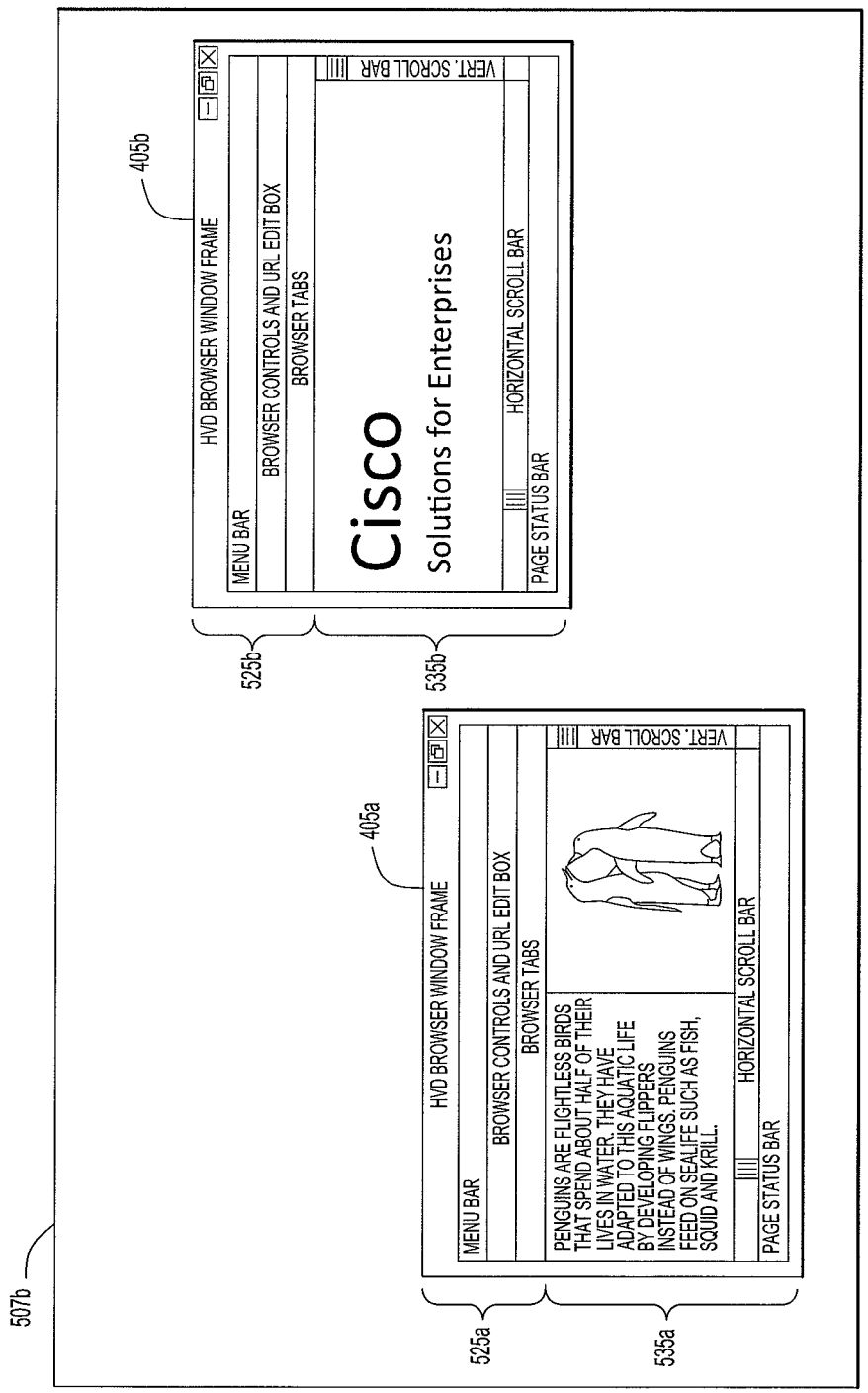
FIG. 6B is an example of a client display including two endpoint browser windows rendered by an endpoint browser after the connection between the HVD and client endpoint is lost.

FIG. 3A represents an example embodiment where the VDI session is active, e.g., the host or network connection is online, and the web browsing is handled by the host browser 320 in conjunction with a frameless endpoint browser 360. An example client endpoint display produced by the embodiment of FIG. 3A is shown in FIG. 6A. If the VDI session 370 becomes inactive, for example because of a failure to establish or maintain the VDI session, then sessions 385 and 390 may also be disrupted, and HTTP session 375 may or may not be disrupted. FIG. 3B represents the same embodiment as FIG. 3A, except that the VDI session has become inactive. In FIG. 3B, it can be seen that an active endpoint browser 366 has been launched on the client endpoint device 205 in place of the frameless endpoint browser 360, and that this endpoint browser 366 utilizes the browser synchronization data stored in storage area 368 to establish a connection (e.g., HTTP session 377) with the web server 20, so that it can render the same web page(s) that were being rendered by the host browser 320 before the VDI session became inactive. The endpoint browser 366 also takes over rendering of any web page(s) that were being rendered by the frameless endpoint browser 360 before the VDI session became inactive. The frameless endpoint browser instance(s) may be terminated while the VDI session is inactive, or they may be minimized or put to sleep, so that the frameless endpoint browser instance(s) remain active on the client endpoint device but no longer render the frameless window(s) while the VDI session is inactive. The endpoint browser server 362 also merges the HVD configuration information with the endpoint local configuration information stored in storage area 369. An example client endpoint display produced by the embodiment of FIG. 3B is shown in FIG. 6B. In this manner, a user of the client endpoint device 205 is able to continue browsing with little or no interruption.

If or when the VDI session is re-established, for example because a failure to establish or maintain the VDI session has been repaired, then the endpoint browser server 362 sends an update of the browser synchronization data, either as stored in storage area 368 or otherwise representing the current state of browser 366, to the HVD host, and in return receives an updated HVD display comprising one or more new HVD browser windows for display to a user of the client endpoint device 205. The endpoint browser server 362 then terminates the endpoint browser instance(s), and re-activates zero or more frameless endpoint browser instance(s) 360, for example by creating a new instance or instances, by awakening one or more frameless endpoint browser instances(s) 360 that had been put to sleep, etc. The situation of re-activation of zero frameless browsers may occur because if, when the VDI session is re-established, policy determines that all of the data for rendering should be rendered by the HVD, then there is no need to re-active a frameless browser at that time. If re-activated, the frameless browser instance(s) begin to render data again, and the scenario depicted in FIG. 3A is re-established.

Figure 4A:
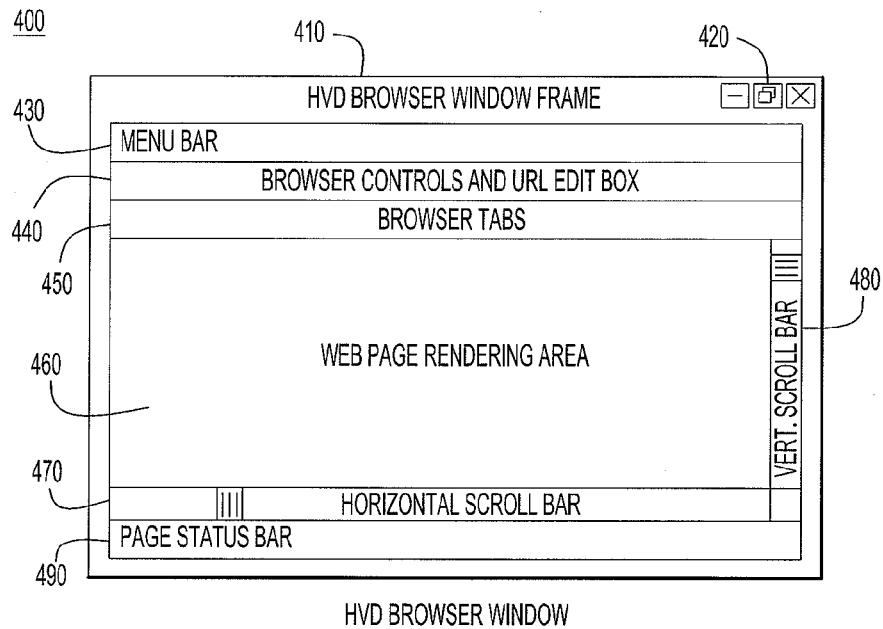
FIG. 4A is an example of a host browser window rendered by a hosted web browser rendered by the HVD.
Figure 4B:
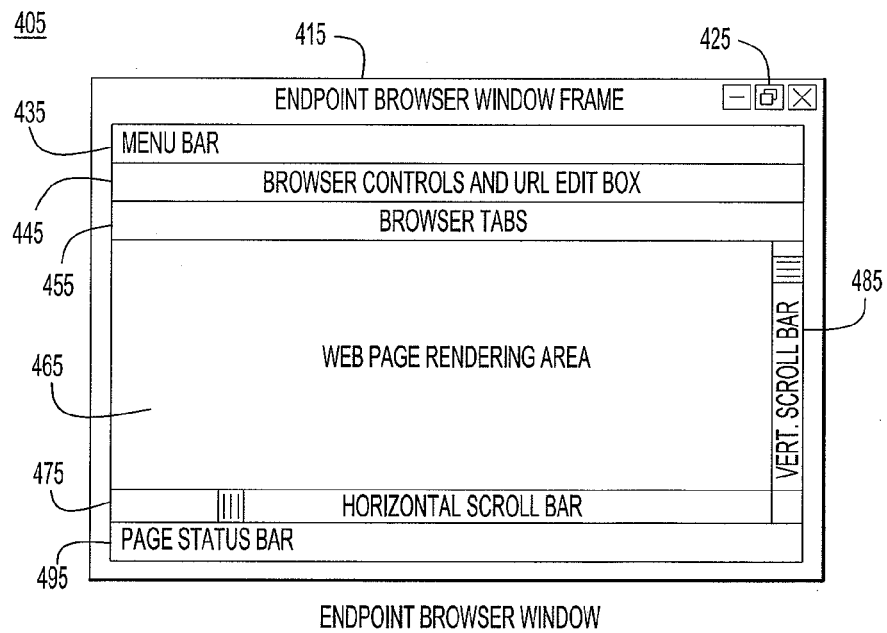
FIG. 4B is an example of an endpoint browser window rendered by a client endpoint browser.

FIGS. 4A and 4B are examples of an HVD browser window 400 (FIG. 4A), and an endpoint browser window 405 (e.g., an active endpoint browser window or a full-frame endpoint browser window) (FIG. 4B). Each browser window 400, 405 comprises a number of browser elements, for example in the depicted examples of FIGS. 4A and 4B, the browser windows each comprise a window frame 410, 415 having window controls 420, 425 to, e.g., minimize, restore, or close the browser window; a menu bar 430, 435 displaying various browser commands (e.g., File, Edit, View, History, Bookmarks, Tools, Help, etc.); browser navigation controls 440, 445 (e.g., forward and backward buttons, a home button, an edit box for manually entering URLs, etc.); and browser tabs area 450, 455, which is displayed if multiple tabs, that is, multiple frames of rendered web pages, only one of which, the active tab, is displayed at a time, are active in the browser window and permits the user to create a tab, switch from tab-to-tab, close a tab, etc. The browser window 400, 405 also comprises a web page rendering area 460, 465; horizontal scroll bars 470, 475 and vertical scroll bars 480, 485 which are present if the content of the web page exceeds the current size of the rendering area; and a page status bar 490, 495 which displays the execution state of the current page.

Figure 4C:
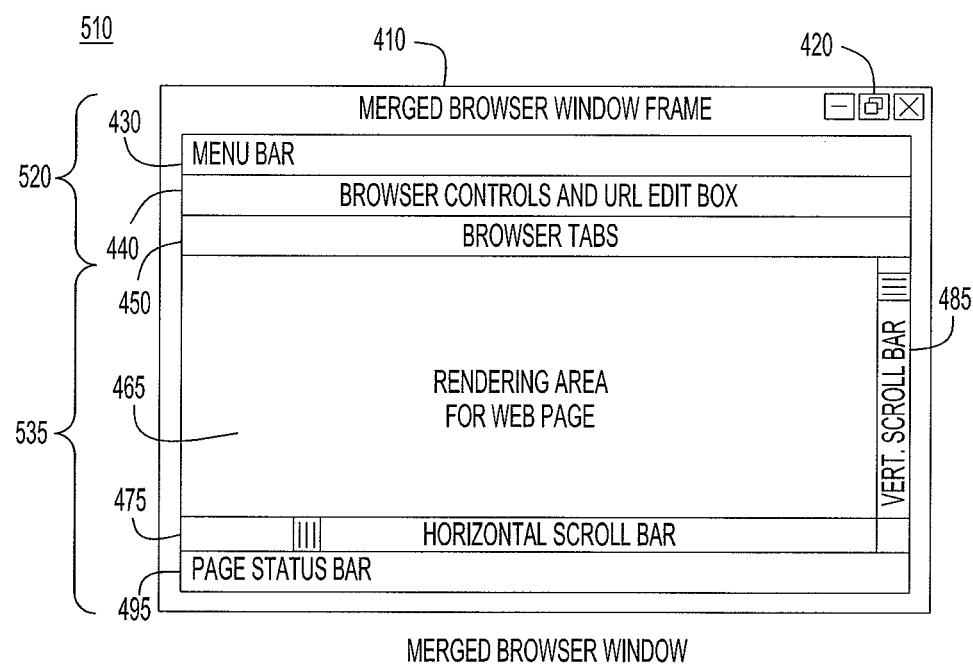
FIG. 4C is an example of a merged browser window in which a frameless client browser window rendered by a client endpoint device is rendered to replace window elements of a host browser window.

For embodiments in which a frameless endpoint browser 360 is present, if a particular web page of the active tab is rendered by the host browser, then a host browser window 400 of FIG. 4A is displayed to a user of the client endpoint device 205. If, however, a particular web page is rendered by the endpoint, then a merged browser window 510 such as the depicted example in FIG. 4C is displayed instead. The merged browser window 510 comprises a frameless client browser window that is rendered to replace portions of HVD browser window 400. The frameless client browser window does not contain any of the window decorations or framing of HVD browser window 400 or endpoint browser window 405, but does comprise endpoint-provided rendering elements 535, including a web page rendering area 465; horizontal and vertical scroll bars 475, 485 if the content of the web page exceeds the current size of the rendering area; and page status bar 495, which displays an execution state of the current page.

FIG. 4C depicts how the endpoint-provided rendering elements 535 of the frameless client browser window are overlaid or composited on top of a placeholder element (not shown) in the HVD browser window 400 as a merged browser window 510. The HVD 150 may send the HVD display including the placeholder element over the VDI session 370. Information about the size and placement of the placeholder element for a client-provided frameless browser window may be sent over the communication session 390, for example placeholder information such as the position of the placeholder in the browser window, the size of the placeholder, and a description of regions of the placeholder that are occluded by other HVD applications in the HVD display.

The merged browser window 510 comprises host-provided window elements 520 (e.g., window decorations, framing elements, and controls 410 through 450 of HVD browser window 400 as shown in FIG. 4A) and endpoint-provided rendering elements 535 of the frameless client browser window. In one embodiment, each instance of the frameless client browser window has a single tab. If the HVD browser window 400 has multiple tabs open, the tabs may represent a mixture of web pages where some are rendered by the host (e.g., the HVD) and some are rendered by the endpoint 205. Each tab rendered by the endpoint 205 is represented by a separate instance of the frameless client browser 360, each of which is composited onto a separate tab in the host browser window 400. The compositing of the browser windows is further described with respect to FIG. 6.

FIG. 5A is an example of an endpoint display 505*a*, which is displayed to a user of the client endpoint device 205 while the VDI session is active. The endpoint display 505*a* comprises an HVD display of an HVD browser window 400 rendered by a host web browser, windows 540, 550 drawn by other HVD applications, and HVD background desktop image 560 which serves as the background image for the HVD display. The browser window 400 comprises host-provided window elements 520 (e.g., window decorations, framing elements, and controls 410 through 450) and host-provided rendering elements 530 (e.g., web page rendering area 460, scroll bars 470, 480 and page status bar 490). It will be appreciated that the HVD display is a virtual display, and the depicted representations of the various elements in the display do not necessarily comprise a simple bitmap of the display. In a Microsoft Windows HVD, the GUI elements may be represented by Graphics Device Interface (GDI) drawing commands and/or Direct3D graphics commands. VDI server 310 may further process these representations to enable their transmission over VDI session 370.

FIG. 5B is an example of an endpoint display 505*b*, which is displayed to a user of the client endpoint device 205 while the VDI session is inactive. The endpoint display 505*b* comprises an endpoint browser window 405 rendered by the endpoint browser 366. The endpoint browser window 405 comprises endpoint-provided window elements 525 (e.g., window decorations, framing elements, and controls 415 through 455) and endpoint-provided rendering elements 535 (e.g., web page rendering area 465, scroll bars 475, 485 and page status bar 495).

FIG. 5 represents an example of an embodiment in which there is no frameless browser, i.e. where no policy exists to apportion the rendering of some web pages to the HVD 150 and the rendering of other (usually multimedia) pages to the client endpoint 205. Therefore, if a VDI session is active, all web browsing will be handled by the HVD, and the client endpoint device 205 will display the display 505*a* comprising one or more HVD browser windows 400 desktop 560, and other application windows 540, 500 to a user. If, however, the VDI session becomes inactive, then the endpoint browser server 362 launches an endpoint browser instance 366, and the endpoint browser instance 366 utilizes the browser synchronization data stored in storage area 368 to recreate an endpoint browser window 405 for each of the HVD browser windows 400 that was active when the VDI session was last active. For example, when the VDI was active, the endpoint display 505*a* comprised an HVD browser window 400 that was currently rendering a Wikipedia web page about penguins. When the VDI session becomes inactive, the client endpoint device 205 will seamlessly switch to a display 505*b* comprising an endpoint browser window 405 that is rendering the same Wikipedia web page (or any other page that was being rendered by the host browser). In this manner, the user is able to continue browsing with little or no interruption. It will be appreciated that, following the VDI failure, only the browser information is restored on endpoint 205. Other application windows on the HVD 540 and 500, as well as desktop GUI 560, are not available during the duration of the VDI failure. In such an example, client endpoint 205 may render an alternate desktop 565 to contain endpoint browser window 405.

FIG. 6 represents an example of an embodiment in which a frameless browser 360 is utilized when the VDI session is active. FIG. 6A is an example of an endpoint display 507*a*, which is displayed to a user of the client endpoint device 205 while the VDI session is active. The endpoint display 507*a* comprises an HVD display of two merged browser windows 510*a*, 510*b*, windows 540, 550 drawn by other HVD applications, and HVD background desktop image 560 which serves as the background image for the HVD display. Each merged browser window 510*a*, 510*b* comprises host-provided window elements 520*a*, 520*b* (e.g., window decorations, framing elements, and controls 410 through 450) and endpoint-provided rendering elements 535*a*, 535*b* (e.g., web page rendering area 465, scroll bars 475, 485 and page status bar 495). It will be appreciated that the HVD display is a virtual display, and the depicted representations of the various elements in the display do not necessarily comprise a simple bitmap of the display. In a Microsoft Windows HVD, the GUI elements may be represented by Graphics Device Interface (GDI) drawing commands and/or Direct3D graphics commands. VDI server 310 may further process these representations to enable their transmission over VDI session 370.

In this example, each frameless browser window comprising endpoint-provided rendering elements 535*a*, 535*b* is rendered by a different instance of the frameless client browser 360. Browser window 510*b* may be created explicitly by the user launching a second HVD browser, by the user requesting that an anchor be rendered in a separate window, or by the user clicking on an anchor (e.g., a link) that specifies that the URL should be rendered in a separate window. It will be understood that, in some configurations, the HVD framing 520*b* may be reduced from the framing 520*a* that was provided for browser window 510*a*, for example, a browser window may be created with minimal window framing 410, 420 and no menu bar 430, browser controls 440, or browser tabs 450.

In the example depicted in FIG. 6A, the placeholder element of each HVD web browser has been replaced by the endpoint-provided rendering elements 535 of the frameless client browser window. The visual replacement of the placeholder with the client-rendered frameless browser window may be accomplished in several ways. For example, the client endpoint device 205 may render the elements 535 of the frameless browser window over the placeholder portion (e.g., host-provided rendering elements 530) of the display 507*a*, or it may render the frameless browser window first and render display 507*a* over the frameless browser window with a "hole" in the display 507*a* where the frameless browser window is located, or in any other suitable fashion to provide the appearance of an integrated display.

In the depicted example, the endpoint-provided rendering elements 535 of the frameless browser window 535 display a web page that may comprise media data such as video data (e.g., CCTV, H264, mp4, QuickTime, etc.), but may also be any other type of data, such as Flash, JavaScript, or Silverlight. Furthermore, users may interact directly with the frameless browser window using endpoint input devices such as a mouse or keyboard, rather than interacting with the HVD through the VDI session 370. Such interaction may occur when it is determined that the frameless browser window has been granted focus, i.e. when the operating system determines that user input should be directed at a web page rendered by the client endpoint 205.

Although the depicted examples are of visual display elements, it will be understood that a similar compositing process takes place for audio. Client endpoint device 205 may receive audio, comprising, for example, application tones, music, voice, or alerts, from HVD 150, via VDI session 370. Client endpoint device 205 may also receive audio content from a content server 30/35, via content transport session 380. Client endpoint device 205 should combine the audio from these two sources and render a coherent audio waveform to speakers 270. The two sources may, for example, be mixed by operating system 355, using audio rendering hardware in client endpoint device 205.

FIG. 6B is an example of an endpoint display 507b, which is displayed to a user of the client endpoint device 205 while the VDI session is inactive. The endpoint display 507b comprises two endpoint browser windows 405a, 405b rendered by the endpoint browser 366. Each endpoint browser window 405a, 405b comprises endpoint-provided window elements 525 (e.g., window decorations, framing elements, and controls 415 through 455) and endpoint-provided rendering elements 535 (e.g., web page rendering area 465, scroll bars 475, 485 and page status bar 495).

FIG. 6 represents an example of an embodiment in which a frameless endpoint browser 360 may be utilized to browse certain content directly by the client endpoint device 205. Therefore, if a VDI session is active, web browsing may be handled by the HVD or the client endpoint device, or both. Thus, the display 507a of FIG. 6A may comprise zero or more merged browser windows 510 to a user, and each of the merged browser windows 510 may comprise a frameless browser window overlaid on an HVD browser window, depending on whether a particular window or tab is rendered by the HVD or the endpoint. If, however, the VDI session becomes inactive, then the endpoint browser server 362 launches an active (full-frame) endpoint browser instance 366 for each window that was active in a merged browser window 510, and the endpoint browser instance 366 utilizes the browser synchronization data stored in storage area 368 to recreate an endpoint browser window 405 for each of the merged browser windows 510 that was active when the VDI session was last active.

For example, when the VDI session was active, the endpoint display 507a comprised a merged browser window 510a where a frameless browser instance was rendering a Wikipedia web page including a video about penguins, and a merged browser window 510b where a host browser was rendering a Cisco web page. When the VDI session becomes inactive, the client endpoint device 205 will utilize synchronization data 368, which has been updated as the state of host browser 320 changed to seamlessly switch to a display 507b as shown in FIG. 6B, that comprises an endpoint browser window 405a that is rendering the same Wikipedia web page (or any other page that was being rendered by the browser) that was previously rendered by the frameless browser instance, and an endpoint browser window 405b that is rendering the same Cisco web page. In this manner, the user is able to continue browsing with little or no interruption.

For both example embodiments of FIGS. 5 and 6, the endpoint browser server monitors the browsing activity and updates the browser synchronization database 368 and the endpoint-specific configuration database 369 as needed while the VDI session is inactive so that the host browser 320 and/or the frameless browser 360 can re-establish control over browsing activity once the VDI session has been restored. This is particularly important in the case of the frameless browser embodiment. For example, taking the scenario depicted in FIG. 6B, assume that while the VDI session remains inactive, the user destroys the first tab (the penguin video) and creates a new tab that is currently rendered by the endpoint browser 366 to view, e.g., an RSS feed, but that would otherwise be rendered by the HVD if the VDI session were active. Once the VDI session is restored, the endpoint browser server 362 communicates the browser synchronization data and any necessary configuration data to the host browser, so that the host browser 320 knows which tabs and windows to render. In the described example, even for the frameless browser embodiment, the host browser 320 would begin rendering the original second window (the Cisco web page) and the new tab (the RSS feed), but there is not currently any data to be rendered by a frameless client browser. Even if the user has not destroyed any tabs or windows, she may have performed other actions, for example searched a term in a search engine and been in the process of reviewing search results. When the VDI session is restored, the communication of data between the endpoint browser server 362 and the host browser 320 ensures that the host browsing is resumed in the same spot (e.g., the third page of the search results) where the user was browsing before the restoration of the VDI session.

The exchange of browser synchronization data and configuration data between the HVD and the endpoint allows for seamless browsing, whether the endpoint is taking over for the host due to a lost VDI session, or whether the host is reassuming control of browsing after restoration of a failed VDI session. The seamless survivability is ideally transparent to the user, but complete transparency may not be achievable in certain embodiments. For example, the user is provided with all of her bookmarks, cookies, user preferences, browser history, etc. as much as is possible, but in some embodiments, certain data, for example HVD-based cookies or certificates, may not be synchronizable, so that the user may notice some browser changes such as favorite pages prompting for passwords, a loss of some browser history, etc. In other embodiments, the user may have been using a first browser type such as Internet Explorer on the HVD, however the client endpoint browser may be a different browser type such as Chrome or Firefox and this difference will be exposed to the user during the VDI outage. Either due to a different browser type, or because synchronization is not perfect, the user may also notice that not all plugins and extensions are available to the endpoint browser 366, so that some web pages that render properly on the HVD may not render properly, for example they may render with missing objects or with javascript errors, on the client endpoint browser.

FIGS. 7 and 8 illustrate examples of the inter-connected operational processes 600 and 700 of the host browser extension 324 at the HVD (FIG. 7) and the endpoint browser server 362 at the client endpoint device 205 (FIG. 8), respectively. These processes 600 and 700 are carried out by the host browser extension 324 and the endpoint browser server 362, respectively, and are inter-related. It may be seen, for example, that the HVD browser extension sends a tab update to the endpoint browser server in step 644, and that the endpoint browser server responds to the received update in step 718. The messages exchanged in processes 600 and 700 may be remote procedure calls (RPCs) or any other suitable messages. If there is no host browser extension 324 present in a particular embodiment, then process 600 is performed by one or both of the host browser 320 and the host browser server 322, and the references to the host browser extension in the following description are understood to refer to the browser component actually performing process 600.

It will be appreciated that FIGS. 7 and 8 describe an example method that allows the HVD browser components 320, 322, 324, and endpoint browser components 360, 362, 364, 366, 368, 369 to send and receive synchronization information so that VDI failure and restoration can be managed between the two devices, while FIGS. 9-13 describe example methods for how the HVD browser components 320, 322, 324, endpoint browser components 360, 362, 364, 366, 368, 396, and policy agent 40 instantiate and remove frameless browsers on the endpoint in an environment with a functioning VDI session, similar to the methods described in the Related Application. It will be further appreciated that to produce a practical system that exhibits both the behavior for executing some web pages on the endpoint in frameless browsers and the VDI failover/failback behavior, one of ordinary skill would combine the methods depicted in FIG. 7 with the methods depicted in FIG. 12, and combine the methods depicted in FIG. 8 with the methods depicted in FIG. 13.

Figure 7A:
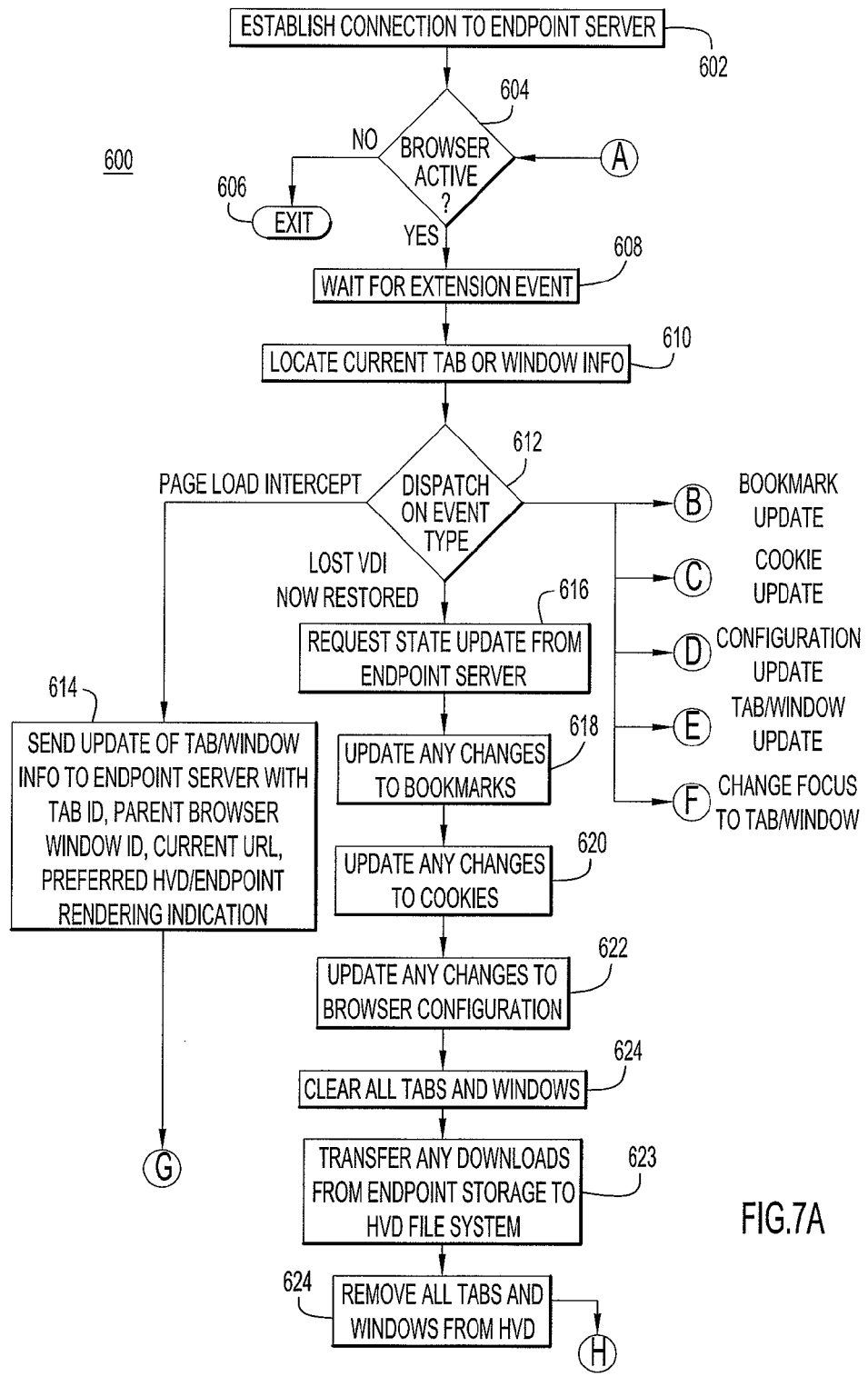
FIGS. 7A, 7B and 7C are an example of a flow chart generally depicting operation of a host browser (or host browser extension) at the HVD.
Figure 7B:
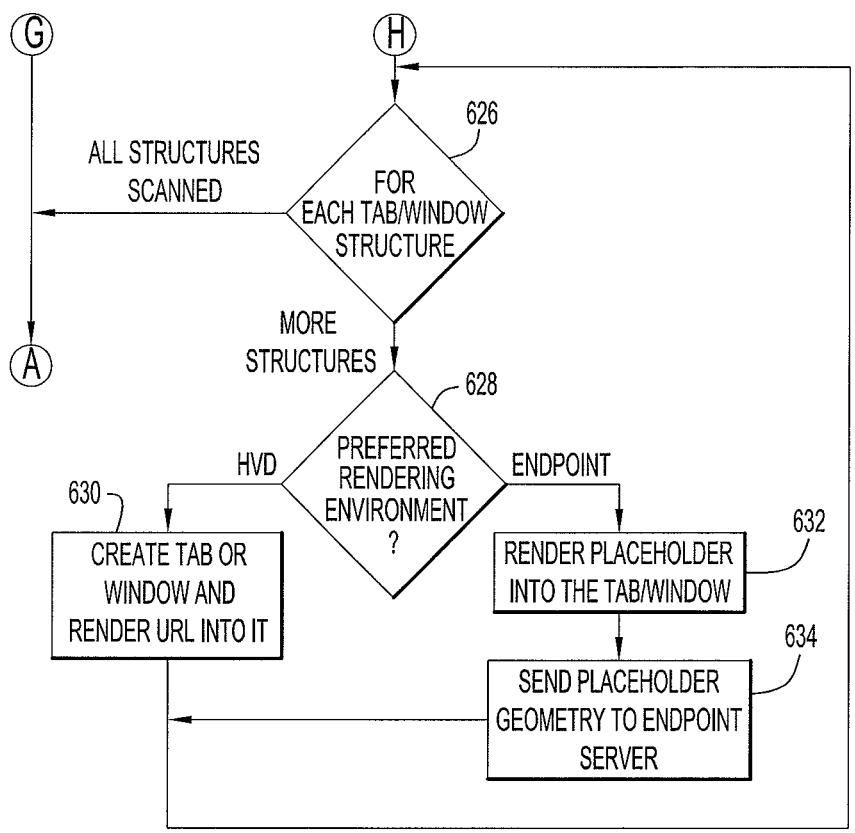
Figure 7C:
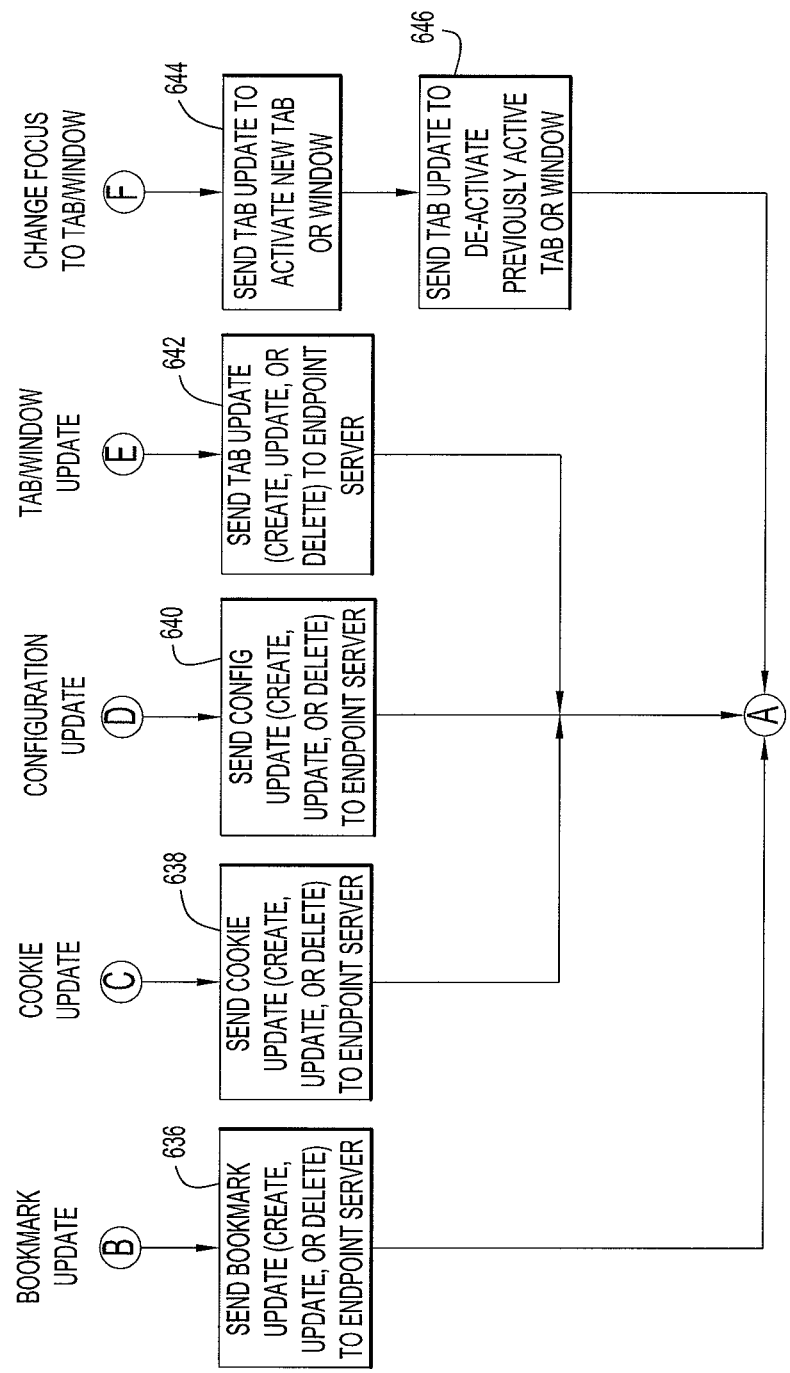

Referring now to FIGS. 7A through 7C, process 600 starts in step 602 by the HVD browser extension 324 establishing a communication session 390 to the endpoint browser server 362, which may take many embodiments, including, but not limited to, use of HTTP, TLS, TCP, or multiplexing onto a virtual channel of VDI session 370. In step 604 the HVD browser extension determines if the host web browser 320 is active. If not, the process 600 ends at step 606, e.g., by terminating process 600 or returning to wait for the browser to become active, but if yes, then in step 608 the HVD browser extension waits to receive an event from the browser. An event may be generated by user interactions with the web page, or scripting associated with the web page, callback requests from the client endpoint device 205, or the arrival of data from communication session 390.

When an event is received, the HVD browser extension proceeds to step 610, where it locates the current tab/window information, that is, information about the tab or window currently active in the HVD browser. The tab information is maintained by the HVD and endpoint browser servers 322, 362 and the HVD and endpoint browser extensions 324, 364, and may be in any suitable form, for example a list of tab information structures keyed by tab identifiers. The tab information is passed back and forth in the messages sent between each browser server 322, 362 and its respective browser extension 324, 364. For the endpoint browser server 362, the tab information points at the instance of the frameless endpoint browser 360 (if any) that is currently in use for this particular tab. For HVD browser extension 324, the tab information maintains a marker indicating whether the current tab is being rendered by the HVD or the endpoint.

In step 612 the HVD browser extension determines the type of event received in step 608, and processes the event according to a particular path before returning to step 604. FIG. 7 presents a few examples of common events that may occur in the same or similar form in many conventional web browsers, and it is understood that the depicted events may be modified or varied from those depicted. The depicted events include page load intercepts, restoration of a lost VDI session, a bookmark update, a cookie update, a configuration update, a tab/window update, and a change of focus for a tab/window.

A page load intercept event is received when the browser is loading a new page, which may result from user actions such as clicking a link in the current page, requesting a bookmarked page, requesting a page from the browser history, using the navigation controls (e.g., a forward or back button), typing a URL in an address bar, etc. For a page load intercept event, the HVD browser extension in step 614 sends an update of the tab/window information to the endpoint browser server 362. The tab information may include one or more of a tab identifier, a parent browser window identifier, the current URL, and an indication of the preferred rendering device (HVD or endpoint), etc. The HVD browser extension then returns to step 604.

If the event is the restoration of a lost or inactive VDI session has been restored, then in step 616 the HVD browser extension requests a state update from the endpoint browser server 362. It will be appreciated that when a VDI session is lost, the HVD browser extension need not take action with respect to the browser state, because the browser application will not receive any user input during the period of the lost connection, and its state is therefore irrelevant to the user. It is only when the VDI connection is restored that the state of the HVD browser needs to be re-synchronized with that of the endpoint browser 366. The HVD browser extension accomplishes the re-synchronization by receiving data from the endpoint browser server 362, for example the browser synchronization data stored in storage area 368 including one or more of data describing the currently open browser tabs and windows, browser preferences data, bookmark data, cookie data, certificate data, user profile configuration data, or browser history data. For example, the HVD browser extension in step 618 updates any changes to bookmarks that are received from the endpoint browser server 362, in step 620 updates any changes to cookies that are received from the endpoint browser server 362, and in step 622 updates any changes to browser configuration data that are received from the endpoint browser server 362. In step 623 the HVD browser extension transfers any files that were downloaded by the endpoint browser 366 during the outage to the proper locations in the HVD file system 160. In step 624 the HVD browser extension removes all tabs and windows from the HVD browser so that the state of the HVD browser can be consistently reconstructed from the tab and window information received from the endpoint browser server 362.

Turning now to FIG. 7B, in step 626, each received structure describing an open tab or window from the endpoint browser 366 is scanned. When all structures have been scanned, the HVD browser extension loops back to 604. If a tab/window structure is located, the HVD browser extension determines the preferred rendering environment for that tab/window structure in step 628. If the preferred rendering environment is the HVD, then in step 630 the HVD browser extension creates a tab or window in the HVD browser and renders the URL specified in the received structure into the tab or window and then returns to step 626 to scan for more structures. If the preferred rendering environment is the endpoint, then in step 632 creates a tab or window in the HVD browser and renders a placeholder page into the tab or window, and in step 634 sends placeholder geometry information to the endpoint browser server 362, before returning to step 626.

Turning now to FIG. 7C, a bookmark update event is received when the stored bookmarks are modified, which may result from user actions such as adding/creating a bookmark, deleting a bookmark, updating bookmarks, sorting bookmarks, etc. For a bookmark update event, the HVD browser extension in step 636 sends a bookmark update to the endpoint browser server 362, and then returns to step 604. A cookie update event is received when the browser cookies are modified, which may result from user or browser actions such as adding/creating a cookie, deleting a cookie, updating cookies, etc. For a cookie update event, the HVD browser extension in step 638 sends a cookie update to the endpoint browser server 362, and then returns to step 604.

A configuration update event is received when the browser configuration data is modified, which may result from user or browser actions adding/creating, deleting, or updating configuration data, such as the configuration data stored in storage area 369. The configuration data may be any suitable browser configuration data, for example one or more of proxy settings, home page data, where to send downloads, which add-ons and plugins to support, whether to open new content in tabs or windows, pop-up blockers, javascript enable/disable settings, in-line image loading, default fonts, language, MIME-to-app and MIME-to-plugin mapping, history on/off, control of plugin installation, remembering passwords, scrolling options, page cache control, whether to auto-update the browser and add-ons, use of SSL/TLS, and certificate management settings, among others. For a configuration update event, the HVD browser extension in step 640 sends a configuration update to the endpoint browser server 362, and then returns to step 604.

A tab/window update event is received when a tab or window is modified, which may result from user actions such as creating a new tab/window, updating a tab/window by, e.g. refreshing the rendered page or by selecting a new URL for display, deleting a tab/window, etc. For a tab/window update event, the HVD browser extension in step 642 sends a tab/window update to the endpoint browser server 362, and then returns to step 604. A change of focus to a tab/window event is received when a change of focus is received, which may result from a user minimizing a tab or window, activating a new tab or window, switching from the current tab or window to a different active tab or window in the browser, etc. For a change of focus event, the HVD browser extension in step 644 sends a tab/window update to the endpoint browser server 362 to take the requested change of focus action, and in step 646 sends a tab/window update to the endpoint browser server 362 to de-activate the previously active tab/window, and then returns to step 604.

Figure 8A:
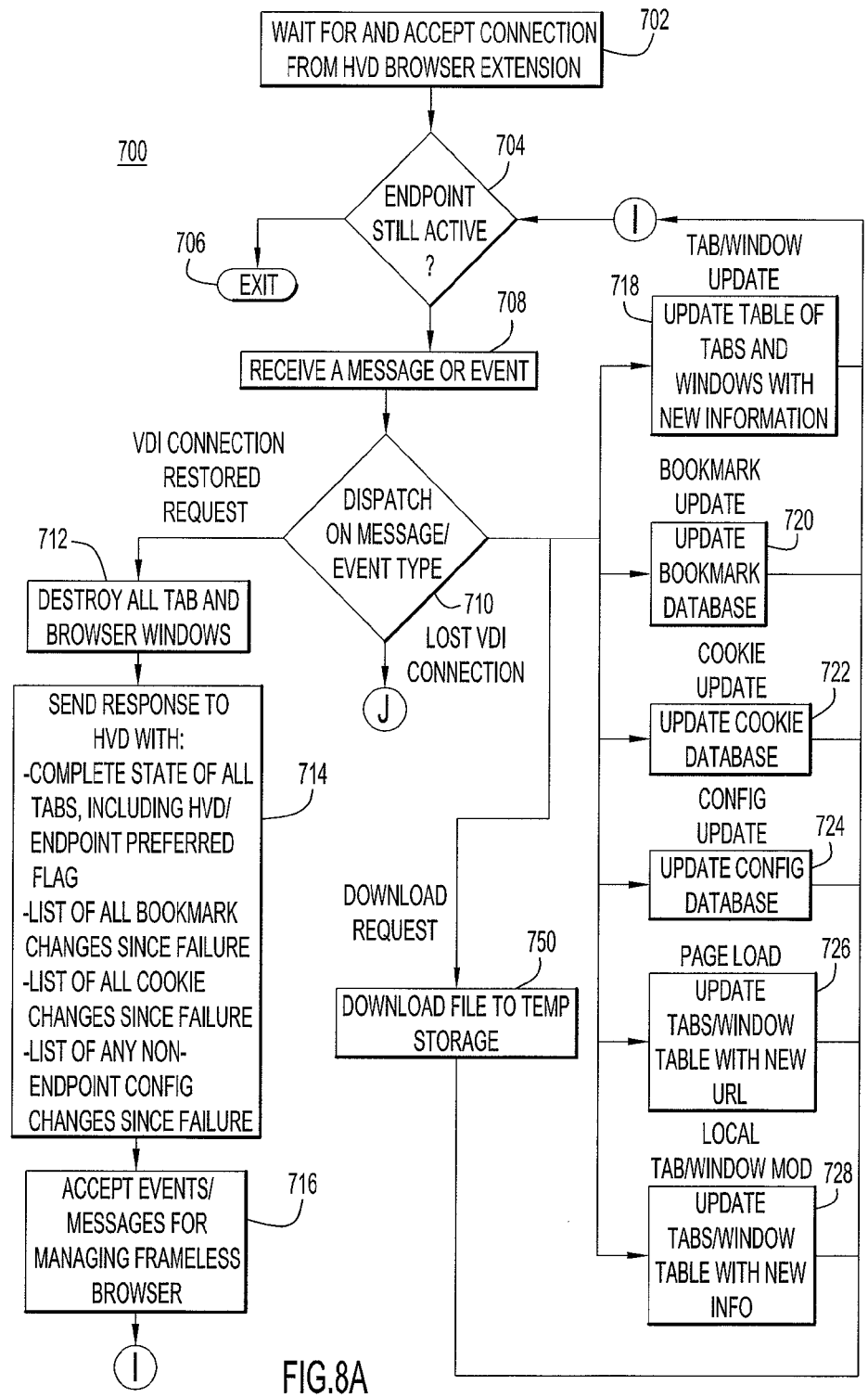
FIGS. 8A and 8B are an example of a flow chart generally depicting operation of an endpoint browser server at the client endpoint device.
Figure 8B:
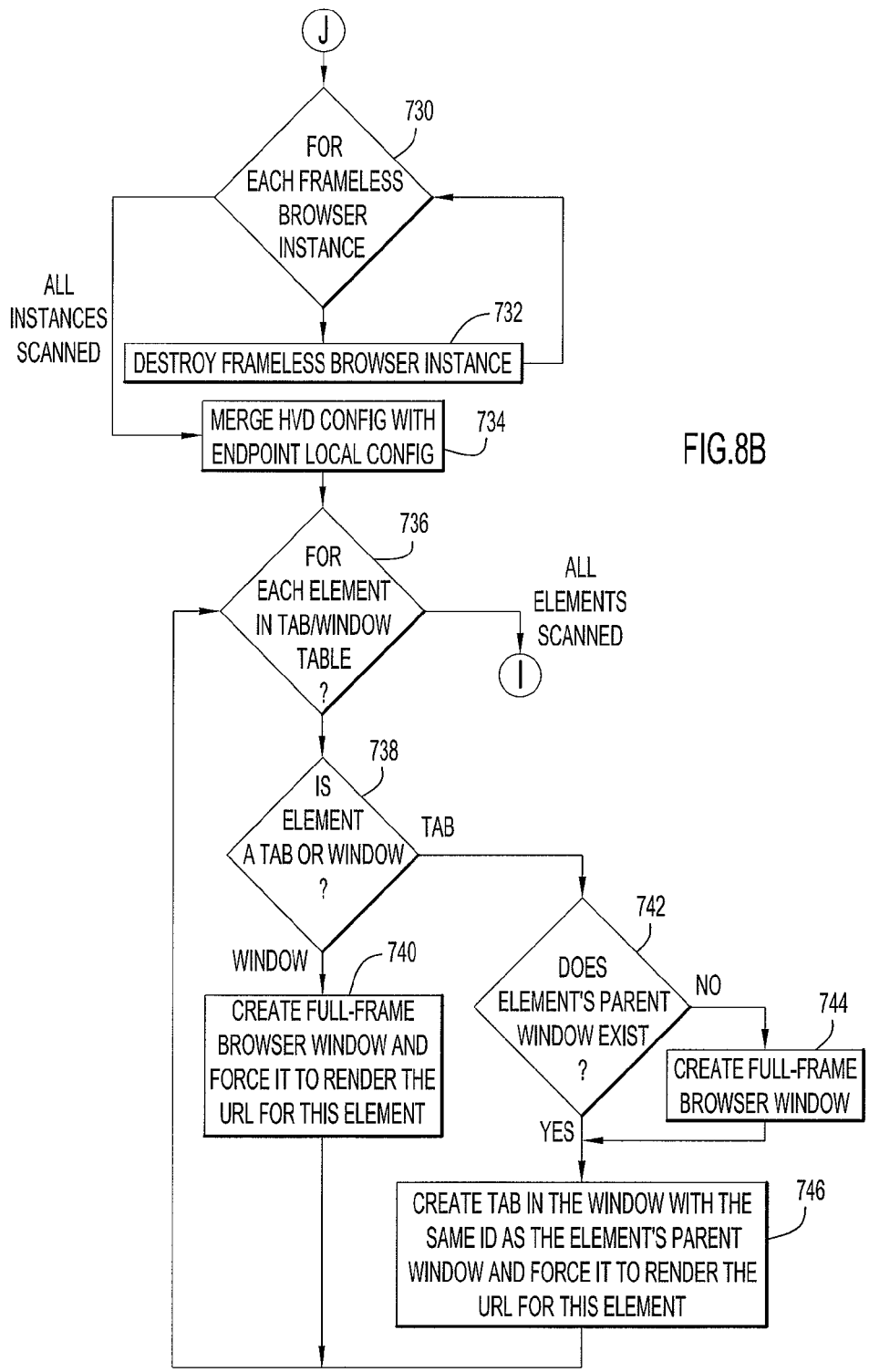

Referring now to FIGS. 8A and 8B, endpoint server process 700 starts in step 702 by the endpoint browser server 362 waiting for and accepting the establishment of communication session 390 by the HVD browser extension. It will be understood that, even if no frameless endpoint browser instances 360 are currently active, process 700 should still be active to listen for incoming connection requests from HVD browser extensions 324. In one embodiment, process 700 is started as part of the bootstrap process for client endpoint device 205, and remains active throughout the period that client endpoint device 205 is operational. In step 704 the endpoint browser server determines if the endpoint device 205 is active, e.g., is connected to a host via a VDI session, etc. If not, the process 700 ends at step 706, e.g., by terminating process 700 or returning to wait for the endpoint device 205 to become active, but if yes, then in step 708 the endpoint browser server waits to receive a message from the HVD browser extension, for example one of the messages sent by HVD extension process 600. When a message is received, the endpoint browser server proceeds to step 710, where it dispatches based on the message/event type received in step 708.

If the received message/event is related to the restoration of the VDI session, then in step 712 the endpoint browser server destroys all tabs and browser windows of the endpoint browser 366, and in step 714 sends a response to the HVD with complete state information, including a flag indicating the preferred rendering environment (e.g., an HVD/endpoint preferred flag) for a particular tab or window, a list of all bookmark and cookie changes since the VDI session became inactive, and a list of any non-endpoint configuration changes since the VDI session became inactive. Depending on the implementation, in step 716 the endpoint browser server may accept events/messages for managing a frameless browser (if any) on the endpoint device, for example as set forth in FIG. 13 (process 1200) before returning to step 704.

If the received message/event is a tab/window update, then in step 718 the endpoint browser server updates its tab information (e.g., a table of tabs and windows stored in synchronized browser database 368) with the new information, and then returns to step 704. If the received message/event is a bookmark update, then in step 720 the endpoint browser server updates its bookmark database (e.g., synchronized browser database 368) with the new information, and then returns to step 704. If the received message/event is a cookie update, then in step 722 the endpoint browser server updates its cookie database (e.g., synchronized browser database 368) with the new information, and then returns to step 704. If the received message/event is a configuration update, then in step 724 the endpoint browser server updates its configuration database (e.g., endpoint-specific configuration database 369) with the new information, and then returns to step 704. If the received message/event is a page load, then in step 726 the endpoint browser server updates its tab information (e.g., a table of tabs and windows stored in synchronized browser database 368) with the new page URL, and then returns to step 704. If the received message/event is a local tab/window modification, then in step 728 the endpoint browser server updates its tab information (e.g., a table of tabs and windows stored in synchronized browser database 368) with the new information, and then returns to step 704.

Turning to FIG. 8B, if the received message/event is related to the loss of a VDI session, then in step 730 the endpoint browser server determines if any frameless browser instances 360 are active, and if so in step 732 destroys each instance. Alternatively, the endpoint browser server may put the instances of the frameless browser to sleep (e.g., minimize them) until restoration of the VDI session. If all instances have been destroyed (or, e.g., put to sleep), then in step 734 the endpoint browser server merges the HVD configuration information with the endpoint local configuration information. In step 736 the endpoint browser server determines if any elements in the tab/window table are active, and if so, in step 738 determines if the element is a tab or a window. If the element is a window, then in step 740 the endpoint browser server launches an active endpoint browser 366 to create a full-frame browser window 405, and then forces the active endpoint browser 366 to render the URL for this element in the new full-frame browser window, before returning to step 704. If the element is a tab, then in step 742 the endpoint browser server determines if the element's parent window exists, if not in step 744 creates a new full-frame browser window 405, and then proceeds to step 746, and if yes, proceeds to step 746. In step 746 the endpoint browser server creates a tab in the browser window with the same identifier as the element's parent window, and forces the tab to render the URL for this element, before returning to step 704.

When the endpoint browser 366 is operable during a VDI outage, the user may click on a web link that results in a file being downloaded, or request to save a file, which will result in a download. It will be appreciated that this event may only occur when the host browser 320 is inaccessible due to the VDI outage. If the received message/event is a download event, then at step 750 the endpoint browser server downloads the file into temporary storage 370.

The operation of the frameless endpoint browser in various example embodiments in which the VDI session is active or has been re-activated may be further understood with reference to FIGS. 3A and 9 through 13 and their accompanying descriptions. Further details of the operation of the frameless endpoint browser and the policy agent are set forth in the Related Application.

The general operation of the frameless endpoint browser in an example embodiment may be understood with reference to FIG. 3A. In this example, the host web browser 320 and frameless endpoint browser 360 work together with their respective browser servers 322, 362 and browser extensions 324, 364 to render web pages. For example, when a user of client endpoint device 205 interacts with a displayed browser window, the appropriate browser extension 324, 364 implements an application programming interface (API) defined by the browsers 320, 360, for use by browser extensions 324, 364. For example, some of the APIs allow the extensions 324, 364 to filter events associated with the user's interaction. For example, if the user is viewing a web page rendered by the HVD in a displayed browser window, and navigates to a different web page using, e.g., a web address such as a Uniform Resource Locator (URL), the HVD browser extension 324 filters the navigation request and queries policy agent 40, and policy agent 40 consults one or more policies to determine whether this URL should be rendered by the host web browser 320 or the frameless endpoint browser 360.

If the URL should be rendered by the host web browser 320, then the host web browser 320 requests and receives from HTML server 20, for example, an HTML- or XHTML-encoded web page associated with the URL, over HTTP session 375, and renders the page for display. If, however, the URL should be rendered by the endpoint browser, then the HVD browser extension 324 establishes a connection 385 with the endpoint browser server 362, and requests that the endpoint browser server 362 instantiate a new instance of a frameless endpoint browser 360. Frameless endpoint browser 360 is deployed as a frameless browser, i.e., it does not render window framing, menus, or other browser controls. The instantiated frameless endpoint browser 360 establishes a content transport session 380, for example an HTTP session, directly with content server 30 (or content cache server 35), requests and receives the appropriate data, and renders it for a user, for example as described with respect to FIGS. 4C and 6.

If the user then navigates to a different web page, e.g., by opening up a new browser tab with a new URL, the endpoint browser extension 364 filters the navigation request and queries policy agent 40, and policy agent 40 consults one or more policies to determine whether this URL should be rendered by the host web browser 320 or the frameless endpoint browser 360. If the URL should be rendered by the frameless endpoint browser 360, then the current instance of frameless endpoint browser 360 is signaled to render the new URL and the appropriate data associated with the new URL is rendered in the current instance of the frameless endpoint browser 360. Alternatively, if the filtered URL is to be rendered in a separate window, for example if a new browser tab or browser instance is to render the URL, then a new instance of the frameless endpoint browser 360 will be instantiated and requested to render the URL. If the URL should be rendered by the host browser 320, however, then the endpoint browser extension 364 establishes a connection 390 with the HVD browser server 322, and notifies the HVD browser server 322 to request and render the appropriate data associated with the new URL.

The policy agent 40 may implement one or more policies to determine which browser should render a particular URL. For example, in one embodiment, the policy agent 40 may utilize a policy that compares the Fully Qualified Domain Name (FQDN) of the URL with domain name data (e.g., a list of domain name records) on the policy agent. If a match is found, the policy agent 40 examines the located data (e.g., a record) to determine if the URL should be rendered by the HVD or endpoint. If no matching data is found, then the policy agent 40 may use a default value (e.g., a default record) to determine whether the HVD or endpoint should render the URL. In another embodiment, the policy agent 40 may use a partial FQDN matching policy, where if the queried FQDN is a child of an FQDN having domain name data (e.g., a record), the policy agent 40 uses the parent data to determine whether the HVD or endpoint should render the URL. In a different embodiment, the policy agent 40 may scan the page associated with the URL for particular content, for example a tag such as an <object> or <embed> tag whose URL references content server 30, or whose Multipurpose Internet Mail Extension (MIME) type indicates a type of object (e.g., audio, video, Java, etc.) that is designated to be rendered on the endpoint 205, or that is not renderable on the client, etc. In yet another embodiment, the policy agent 40 may scan the page associated with the URL for specialized (e.g., proprietary) tags inserted into the HTML that indicate whether the page should be rendered by the HVD or endpoint.

In another embodiment, the activity of the policy agent is suppressed if the browser request originates from an anchor located inside an inline frame, e.g., in an <iframe> element, so that such requests are always handled by the browser attempting to access the anchor. In a different embodiment, the activity of the policy agent is suppressed if the browser request is associated with a conferencing or screen sharing application, such as Cisco WebEx, IBM LotusLive Meetings, Microsoft Office Live Meeting, Skype Screen Sharing, etc., so that such requests are always handled by the HVD browser. In these embodiments, the policy suppression provides an improved browser quality because it avoids having an individual web page partially rendered by the host browser and partially rendered by the client endpoint browser. Policy suppression may also permit a set of pages that share local data via a scripting language, for example javascript, to function properly by ensuring that the pages are all executed within a single browser instance.

The one or more policies may indicate that streaming media and other similar data should be rendered by the endpoint 205. For example, in one embodiment the policies may indicate that particular types of content data, such as animations, applications, audio, games, graphics, models, simulations, telephony, video, and web-based push-to-talk should be rendered by the endpoint 205. Or, in another embodiment, the policies may indicate that particular URLs should be rendered by the endpoint 205, for example URLs for video content servers (e.g., YouTube) or audio content servers (e.g., streaming radio stations), etc.

In one embodiment, an instance of frameless endpoint browser 360 is created for each browser tab or browser window rendering a web page that policy determines should be rendered on the client endpoint device 205. However, because policy agent 40 may have determined that all current web pages should be rendered in HVD browser tabs and windows, it is possible that zero instances of frameless endpoint browser 360 may be present on client endpoint device 205. In this case, endpoint browser server 362 should still be present, so that connection requests from HVD browser extension 324 may still be received, and so endpoint browser server 362 can create an instance of frameless endpoint browser 360. Hence, for some embodiments, endpoint browser server 362 should be permanently resident on client endpoint device 205, even if the frameless endpoint browser 360 is not yet instantiated. Then, when HVD browser extension 324 notifies endpoint browser server 362 to instantiate a frameless endpoint browser 360 instance, the frameless endpoint browser 360 generally instantiates the endpoint browser extension 364, and the HVD browser server 322 is instantiated as well.

The client endpoint device 205 is responsible for rendering both the HVD display and the client-provided frameless browser windows rendered by the various frameless endpoint browser instances. The ability of the client endpoint to render the complete display depends on multiple factors including the client operating system 355, the display rendering hardware 240, and the like. In particular, it is the responsibility of the client operating system 355 to accomplish compositing. In most windowed operating systems, compositing is accomplished by the operating system drawing each individual window according to a z-order, which describes the relative depth of the various windows. Windows with the deepest (lowest) z-order are drawn first, and each window with a successively shallower (higher) z-order is drawn subsequently, which may result in the deeper windows being partially or fully occluded on the display. The assignment of higher-valued integers to shallower windows is somewhat arbitrary, but higher z-order shall herein be understood to imply shallower windows, i.e., windows stacked closer to the user's eyes. For example, for a merged browser window 510 where the host-provided elements 520 are from an HVD, the endpoint-provided elements 535 of the frameless client browser window will have a higher z-order than the window used to render the host-provided elements 520 and the HVD display. If the host-provided elements 520 are from a hosted virtual application (HVA), then the endpoint-provided elements 535 of the frameless client browser window will have a higher z-order than that of the window used to render the HVA display but lower than that of any HVA windows or endpoint application windows that may fully or partially occlude the HVA display.

It should be appreciated, however, that the VDI client 350 may receive all virtual display information (i.e., the HVD display comprising a browser window 510 with host-provided window elements 520 and a placeholder element, other HVD application windows 540, 550, and the HVD background desktop image 560) from VDI session 370 and may request the client operating system 355 to render the entire virtual display as a single rectangular window. Thus, although window 540 or 550 may have a higher z-order on the HVD than the browser window 510, the client endpoint device 205 may composite the frameless client browser window so that the composited images have a higher z-order than the HVD display.

The compositing becomes more complex when the merged browser window 510 is partially occluded. For example, if one or both of the application windows 540, 550 shown in FIG. 6A are brought to the foreground of the display through recent user interaction, they will partially occlude the browser window 510, even though portions of browser window 510 are being rendered on the client endpoint device 205 using the frameless endpoint browser 360. Because the VDI server 310 may composite all applications on the HVD 150 into a single HVD display, which is then communicated to the client endpoint device 205, the placeholder element may not be a simple rectangle, implying that the compositing of the endpoint-provided rendering elements 535 of the frameless browser window cannot be accomplished by requesting that client operating system 355 render a simple rectangle on top of the HVD display, as was the case in FIG. 6A.

The client endpoint device 205 creates the appearance that the endpoint-provided rendering elements 535 are partially occluded, however, by rendering either the frameless client browser window or the remainder of display 507a as non-rectangular shapes. For example, the client endpoint device 205 may composite the frameless client browser window in only the non-occluded portions of the placeholder element. This means that the frameless client browser window may be rendered as a non-rectangular shape. Alternatively, the client endpoint device 205 may render the frameless client browser window as a rectangular shape, and render the remainder of display 507a with a non-rectangular "hole" over the portion of the frameless client browser window desired to be displayed.

To efficiently render the display, the client operating system 355 should be able to accept requests to render non-rectangular images without interfering with the images on the rest of the display. The endpoint browser server 362 should therefore be able to be informed of the non-rectangular geometry, so that this information may be communicated to the operating system 355. In one example, the HVD browser extension 324 interacts with HVD operating system 315 to compute the geometry of the non-occluded portions of the placeholder window and communicates that window geometry information to the endpoint browser server 362 over the communication session 390. In another example, HVD browser extension 324 fills placeholder element with a placeholder image, for example a low bandwidth image such as a monochrome page, so that endpoint browser server 362 and operating system 355 may compute the non-rectangular region by detecting what portions of the virtual display contain the placeholder image. Operating system 355 should also be able to render the non-rectangular images at high speed and at a low impact to the CPU of the client endpoint device 205. In one example of such an efficient rendering, operating system 355 is aware of display rendering hardware 240, which comprises, for example, a graphics processing unit (GPU) capable of rendering non-rectangular images. Further details of the compositing of the frameless browser window are set forth in the Related Application.

Figure 9A:
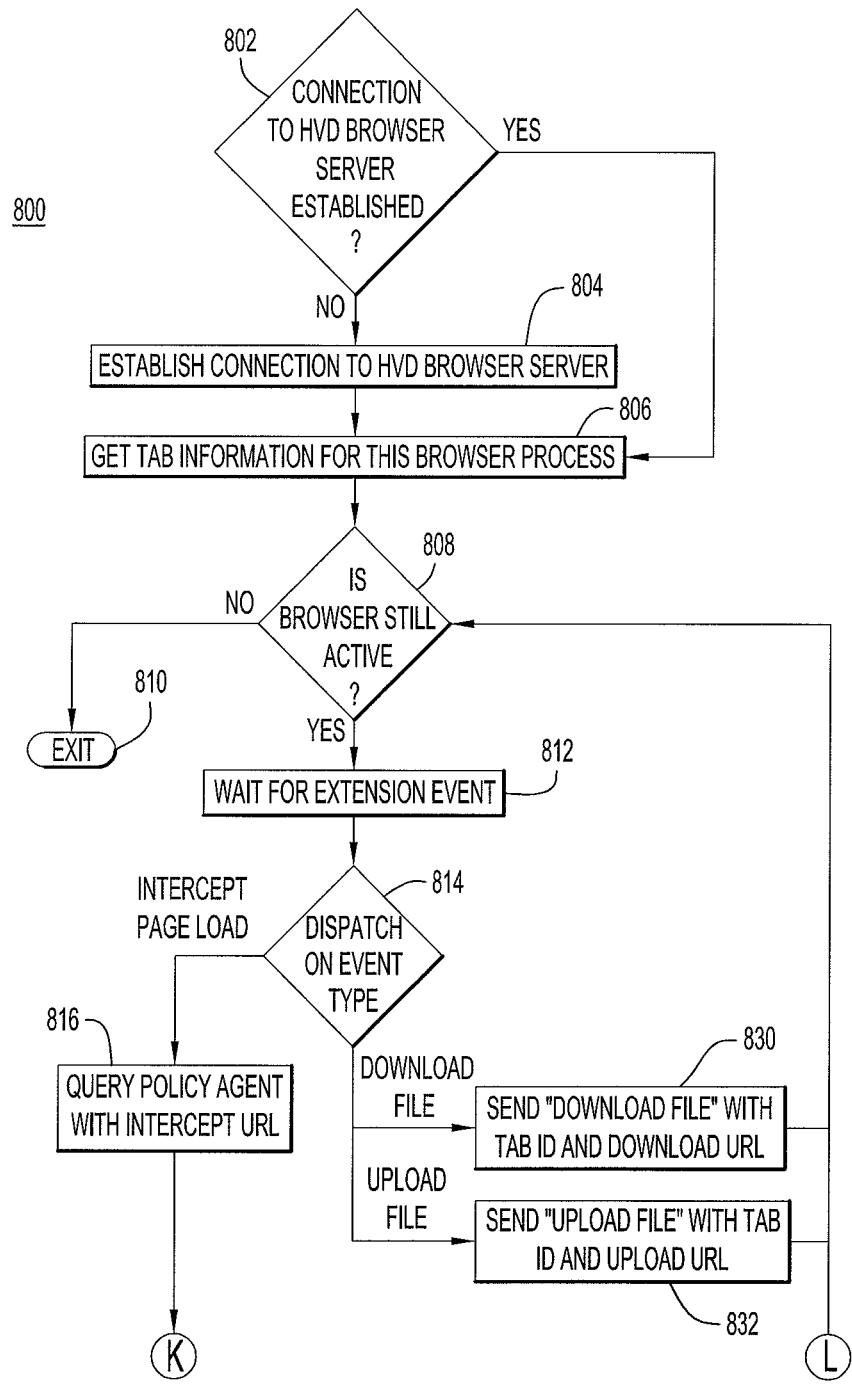
FIGS. 9A and 9B are an example of a flow chart generally depicting operation of an endpoint browser extension at the client endpoint device with respect to an example embodiment in which a frameless endpoint browser is implemented.
Figure 9B:
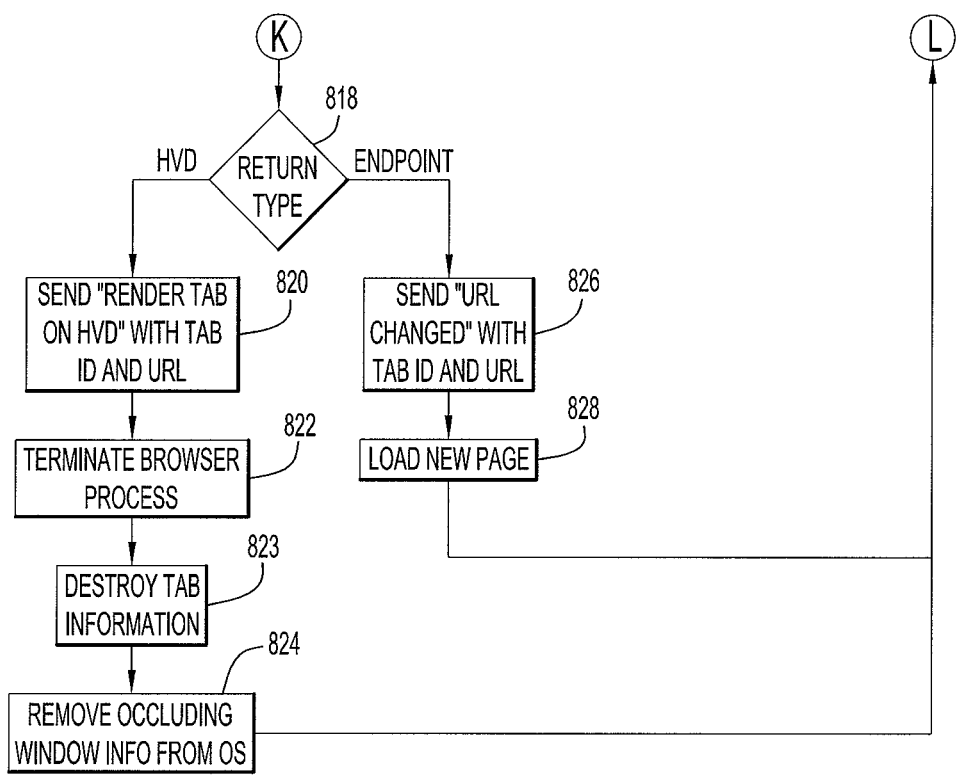
Figure 10:
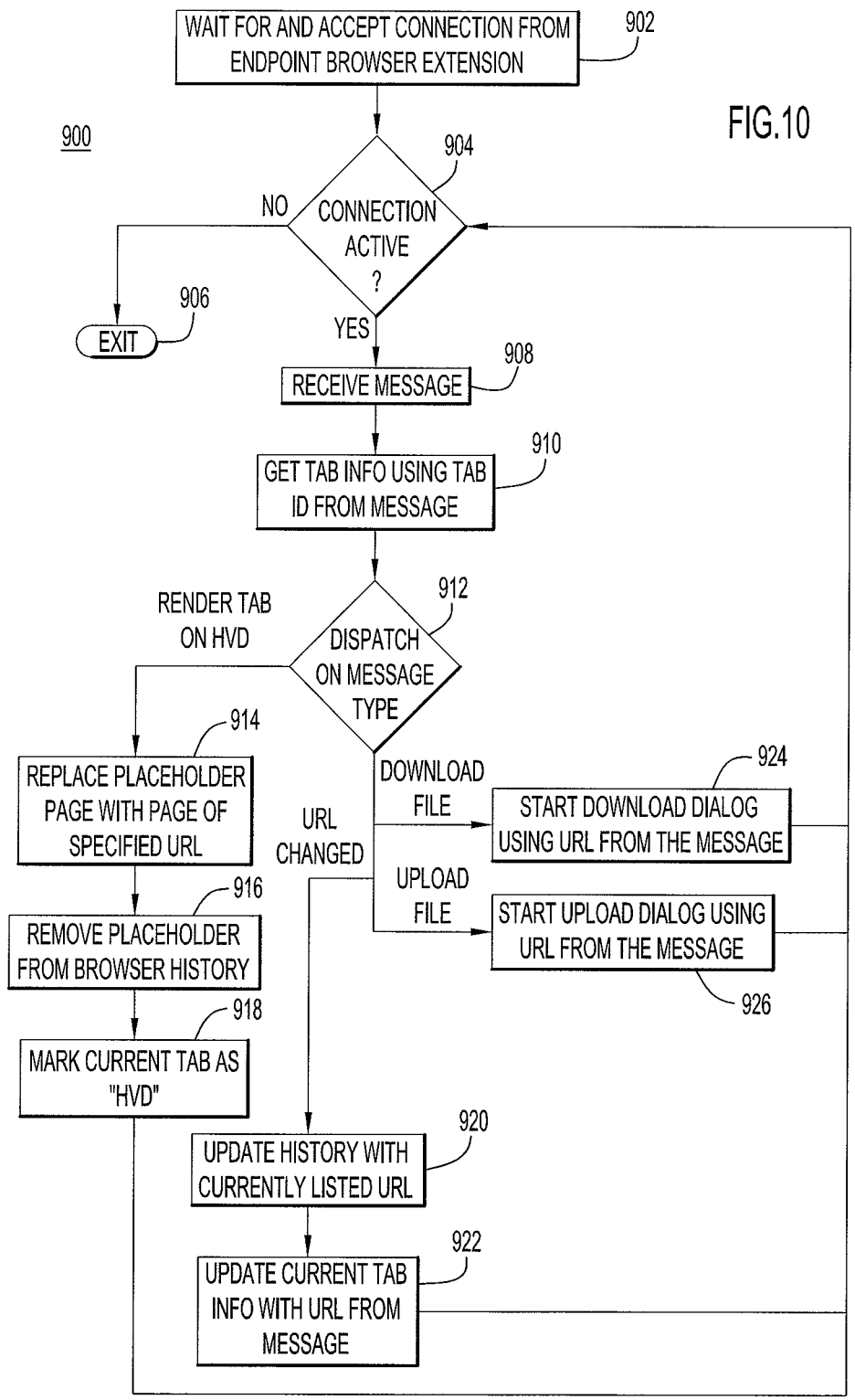
FIG. 10 is an example of a flow chart generally depicting operation of a host browser server at the HVD with respect to an example embodiment in which a frameless endpoint browser is implemented.

A detailed understanding of the operation of the frameless endpoint browser and the policy agent in an example embodiment may be understood with reference to FIGS. 9 through 13. In particular, FIGS. 9 and 10 illustrate examples of the inter-connected operational processes 800 and 900 of the endpoint browser extension 364 at the client endpoint device 205 (FIG. 9) and the HVD browser server 322 at the HVD (FIG. 10), respectively. These processes 800 and 900 are carried out by the endpoint browser extension 364 and the HVD browser server 322, respectively, and are inter-related. It may be seen, for example, that the endpoint browser extension sends a message to the HVD browser server in step 818, and that the HVD browser server responds to the received message by taking various actions, for example by rendering a tab in step 914. The messages exchanged in processes 800 and 900 may be remote procedure calls (RPCs) or any other suitable messages. If there is no endpoint browser extension 364 present in a particular embodiment, then process 800 is performed by one or both of the frameless endpoint browser 360 and the endpoint browser server 362, and the references to the endpoint browser extension in the following description are understood to refer to the browser component actually performing process 800. Similarly, if there is no HVD browser server 322 present in a particular embodiment, then process 900 is performed by one or both of the HVD browser 320 and the HVD browser extension 324 (if present), and the references to the HVD browser server in the following description are understood to refer to the browser component actually performing process 900.

Although not depicted here, it is understood that processes 800 and 900 operate in conjunction with the host sending an HVD display image 500 from the HVD to the client endpoint, where the HVD display comprises at least one placeholder element, as previously described with respect to FIG. 3A. The client endpoint device 205 may receive the HVD display image via VDI client 350 and the VDI session 370. The HVD display image may be transported as a single window comprising the entire HVD display image, or as a separate virtual image for each hosted virtual application, or a combination of the two. The processes 800 and 900 may also run concurrently with processes 1100 and 1200. It should be noted that because multiple instances of frameless client browser 360 may be active at the same time, there may be multiple processes 800 also active at the same time, each process 800 being associated with a particular instance of frameless client browser 360.

Referring now to FIG. 9, process 800 starts in step 802 by the endpoint browser extension 364 determining if a communication session 385 with the HVD browser server 322 has been established, and if no proceeding to step 804 and if yes proceeding to step 806. In step 804, the endpoint browser extension establishes communication session 385 to the HVD browser server 322, which may take many embodiments, including, but not limited to, use of HTTP, TLS, TCP, or multiplexing onto a virtual channel of VDI session 370. In step 806, the endpoint browser extension obtains the tab information for the browser instance associated with the current process, for example by querying the endpoint browser server 362. In step 808 the endpoint browser extension determines if its associated browser instance is active. If not, the process 800 ends at step 810, e.g., by terminating process 800 or returning to wait for the browser instance to become active, but if yes, then in step 812 the HVD browser extension waits to receive an event from the browser. An event may be generated by user interactions with the web page, or scripting associated with the web page, or requests from the HVD.

In step 814 the endpoint browser extension determines the type of the received event, and processes it according to a particular path before returning to step 804. FIG. 9 presents a few examples of common events that may occur in the same or similar form in many conventional web browsers, and it is understood that the depicted events may be modified or varied from those depicted. The depicted events include page load intercepts, downloading files and uploading files.

For a page load intercept event, the endpoint browser extension in step 816 queries the policy agent with the URL of the intercept page desired to be loaded, and in step 818, determines whether the response from the policy specifies whether the HVD or the endpoint should render the new page. If the HVD should render the new page, then the endpoint browser extension in step 820 sends a "render tab on HVD" message containing the tab identifier and the URL to the HVD browser server 322, in step 822 terminates the associated browser instance, and in step 823 destroys the tab information associated with the browser instance, for example by interacting with the endpoint browser server 360. In step 824 the endpoint browser extension removes occluding window information for this browser instance from the endpoint operating system 355, and returns to step 804. If the endpoint should render the new page, then the endpoint browser extension in step 826 sends a "URL changed" message containing the new tab identifier and the URL to the HVD browser server 322, and in step 828 loads the new page, and returns to step 804. Because all files should be downloaded and uploaded on the HVD side, for a file download event, the endpoint browser extension in step 830 sends a "download file" message containing the new tab identifier and the URL to the HVD browser server 322, and returns to step 804. For a file upload event, the endpoint browser extension in step 830 sends an "upload file" message containing the new tab identifier and the URL to the HVD browser server 322, and returns to step 804.

Referring now to FIG. 10, process 900 starts in step 902 by the HVD browser server 362 waiting for and accepting the establishment of communication session 385 by the endpoint browser extension. In step 904 the HVD browser server determines if the endpoint device 205 is active, e.g., is connected to a host via a VDI session, etc. If not, the process 900 ends at step 906, e.g., by terminating process 900 or returning to wait for the endpoint device 205 to become active, but if yes, then in step 908 the HVD browser server waits to receive a message from the endpoint browser extension, for example one of the messages sent by process 800. When a message is received, the HVD browser server proceeds to step 910, where it locates the tab information based on the tab identifier in the message. In step 912 the HVD browser server processes the received message according to its type, before returning to step 904.

For a "render tab on HVD" message, the HVD browser server in step 914 replaces the placeholder element in the HVD browser window with the rendered page of the new URL from the message, in step 916 removes the placeholder page from the browser history, and in step 918 marks the current tab as rendered by the HVD, and returns to step 904. It will be understood that, by removing the placeholder page from the browser history, if the user invokes the browser's "back" control, the display will smoothly switch between the current page rendered on the HVD and the previous page rendered on the endpoint without anomalously viewing the placeholder page, which should not be seen by the user, because the endpoint composites the endpoint's frameless browser instance in its place. For a "URL changed" message, the HVD browser server in step 920 updates the browser history with the current URL, so that the user may use the "back" control to access more than one page that has been consecutively rendered on the endpoint, and in step 922 updates the current tab information with the new URL from the message, and returns to step 904. For a "download file" message, the HVD browser server in step 924 starts a download dialog using the new URL from the message to download the file, and returns to step 904. For an "upload file" message, the HVD browser server in step 926 starts an upload dialog using the new URL from the message to upload the file, and returns to step 904.

Figure 11:
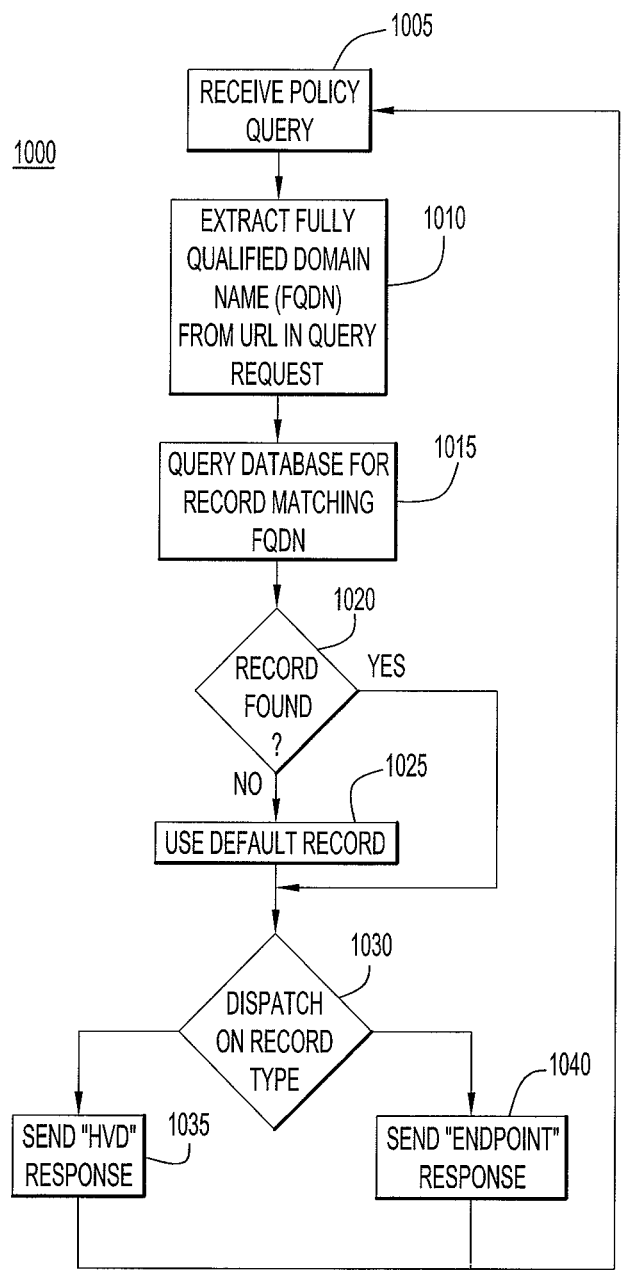
FIG. 11 is an example of a flow chart generally depicting operation of a policy agent query process with respect to an example embodiment in which a frameless endpoint browser is implemented.

FIG. 11 illustrates an example of a flow chart generally depicting operation of a policy agent query process 1000 performed by policy agent 40. It will be understood that this example represents a discrete policy agent, accessible from both the HVD and the endpoint as a network service, for example as depicted in FIG. 1. In other embodiments, the policy agent may be a library co-resident on both the HVD and the endpoint. In step 1005, the policy agent receives a policy query containing an URL, for example from the HVD browser extension 324 or endpoint browser extension 364 as part of process 1100 or 800, respectively. In step 1010 the policy agent extracts the Fully Qualified Domain Name (FQDN) from the URL in the query request, and in step 1015 queries a database for a record matching the FQDN. In step 1020 the policy agent determines if a record was found, and if no proceeds to step 1025 and if yes proceeds to step 1030. In step 1025, the policy agent selects a default record to use, and proceeds to step 1030. The default record represents a default policy choice (e.g., to render URLs containing the current FQDN on either the HVD or the endpoint). In step 1030, the policy agent consults the located record (either the record matching the FQDN or the default record) for an indication of whether the received URL should be rendered by the HVD or endpoint, and dispatches based on the indication in the record. If the record indicates HVD, then in step 1035 the policy agent sends an "HVD" response to the querying browser extension, but if the record indicates endpoint, then in step 1040 the policy agent sends an "endpoint" response to the querying browser extension. After step 1035 or 1040, the process returns to step 1005 to wait for the next policy query.

FIGS. 12 and 13 illustrate examples of the inter-connected operational processes 1100 and 1200 of the host browser extension 324 at the HVD (FIG. 12) and the endpoint browser server 362 at the client endpoint device 205 (FIG. 13), respectively. These processes 1100 and 1200 are carried out by the host browser extension 324 and the endpoint browser server 362, respectively, and are inter-related. It may be seen, for example, that the HVD browser extension sends a message to the endpoint browser server in step 1126, and that the endpoint browser server responds to the received messages by taking various actions, for example by creating a browser instance in steps 1218-1224. The messages exchanged in processes 1100 and 1200 may be remote procedure calls (RPCs) or any other suitable messages. If there is no host browser extension 324 present in a particular embodiment, then process 1100 is performed by one or both of the host browser 320 and the host browser server 322, and the references to the host browser extension in the following description are understood to refer to the browser component actually performing process 1100.

Although not depicted here, it is understood that processes 1100, 1200 operate in conjunction with the host sending an HVD display image 500 from the HVD to the client endpoint, where the HVD display comprises at least one placeholder element, as previously described with respect to FIG. 3. The client endpoint device 205 may receive the HVD display image via VDI client 350 and the VDI session 370. The HVD display image may be transported as a single window comprising the entire HVD display image, or as a separate virtual image for each hosted virtual application, or a combination of the two.

Figure 12A:
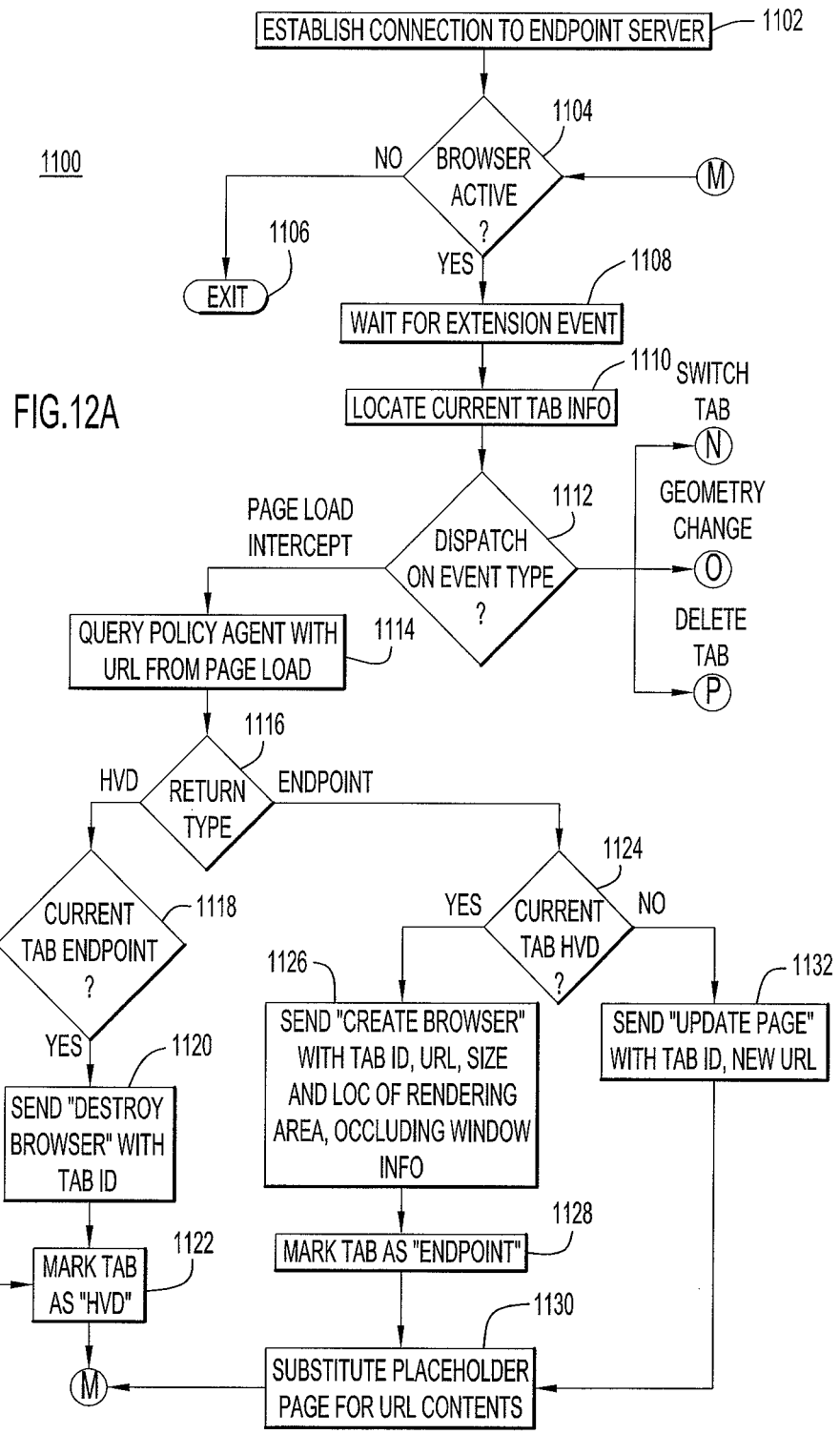
FIGS. 12A and 12B are an example of a flow chart generally depicting operation of a host browser extension at the HVD with respect to an example embodiment in which a frameless endpoint browser is implemented.
Figure 12B:
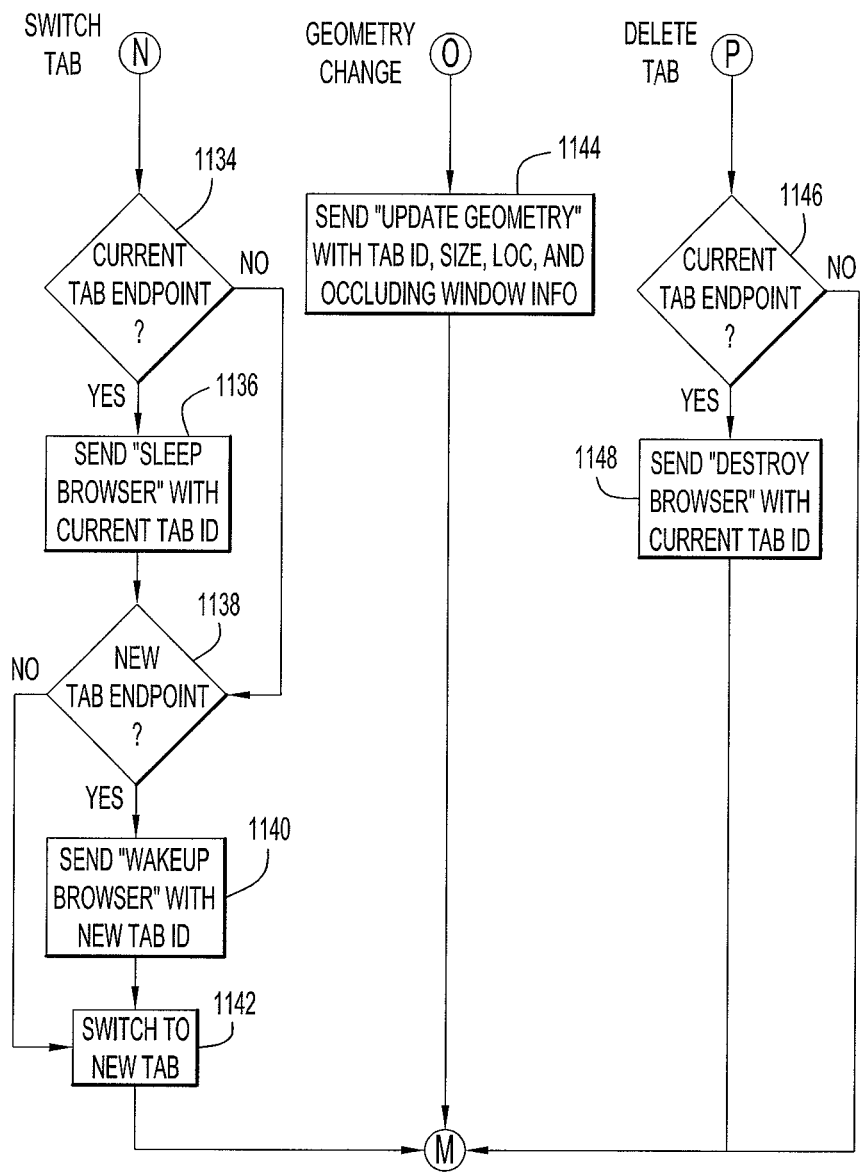

Referring now to FIGS. 12A and 12B, process 1100 starts in step 1102 by the HVD browser extension 324 establishing a communication session 390 to the endpoint browser server 362, which may take many embodiments, including, but not limited to, use of HTTP, TLS, TCP, or multiplexing onto a virtual channel of VDI session 370. In step 1104 the HVD browser extension determines if the host web browser 320 is active. If not, the process 1100 ends at step 1106, e.g., by terminating process 1100 or returning to wait for the browser to become active, but if yes, then in step 1108 the HVD browser extension waits to receive an event from the browser. An event may be generated by user interactions with the web page, or scripting associated with the web page, or callback requests from the client endpoint device 205.

When an event is received, the HVD browser extension proceeds to step 1110, where it locates the current tab information, that is, information about the tab currently active in the HVD browser. The tab information is maintained by the HVD and endpoint browser servers 322, 362 and the HVD and endpoint browser extensions 324, 364, and may be in any suitable form, for example a list of tab information structures keyed by tab identifiers. The tab information is passed back and forth in the messages sent between each browser server 322, 362 and its respective browser extension 324, 364. For the endpoint browser server 362, the tab information points at the instance of the frameless endpoint browser 360 that is currently in use for this particular tab. For HVD browser extension 324, the tab information maintains a marker indicating whether the current tab is being rendered by the HVD or the endpoint.

In step 1112 the HVD browser extension determines the type of event received in step 1108, and processes the event according to a particular path before returning to step 1104. FIG. 12 presents a few examples of common events that may occur in the same or similar form in many conventional web browsers, and it is understood that the depicted events may be modified or varied from those depicted. The depicted events include page load intercepts, tab switching, geometry changes, and tab deletion.

A page load intercept event is received when the browser is loading a new page, which may result from user actions such as clicking a link in the current page, requesting a bookmarked page, requesting a page from the browser history, using the navigation controls (e.g., a forward or back button), typing a URL in an address bar, etc. For a page load intercept event, the HVD browser extension in step 1114 queries the policy agent with the URL of the page desired to be loaded, and in 1116 determines whether the policy agent specified whether the HVD or the endpoint should render the new page. If the HVD should render the new page, then the HVD browser extension in step 1118 checks to determine if the currently active tab is being rendered by the endpoint, if yes, in step 1120 sends a "destroy browser" message containing the current tab identifier to the endpoint browser server 362 and proceeds to step 1122, and if not, proceeds to step 1122. In step 1122, the HVD browser extension marks the new tab as rendered by the HVD, and returns to step 1104.

If the endpoint should render the new page, then the HVD browser extension in step 1124 checks to determine if the currently active tab is being rendered by the HVD, and if yes, in step 1126 sends a "create browser" message containing the new tab identifier to the endpoint browser server 362. The "create browser" message also contains the new URL, and information about the size and location of the placeholder element, occluding window(s), etc. In step 1128, the HVD browser extension marks the new tab as rendered by the endpoint, and in step 1130 substitutes a page containing at least one placeholder element for the currently displayed web page, and returns to step 1104. If the determination in step 1124 is no, then the HVD browser extension in step 1132 sends an "update page" message containing the current tab identifier and the new URL to the endpoint browser server 362, and proceeds to step 1130.

Turning to events processed in FIG. 12B, a switch tab event is an event when the browser switches from the current tab to a different active tab in the browser, which may result from user actions such as clicking on a different tab or using navigation controls to move from tab to tab. For a switch tab event, the HVD browser extension in step 1134 determines if the current tab is being rendered by the endpoint, if yes proceeds to step 1136 and if no proceeds to step 1138. In step 1136, the HVD browser extension sends a "sleep browser" message containing the current tab identifier to the endpoint browser server 362, and proceeds to step 1138. In step 1138, the HVD browser extension determines if the new tab should be rendered by the endpoint, if yes proceeds to step 1140 and if no proceeds to step 1142. In step 1140, the HVD browser extension sends a "wakeup browser" message containing the new tab identifier to the endpoint browser server 362, and proceeds to step 1142. In step 1142, the HVD browser extension switches to the new tab, and returns to step 1104.

A geometry change event is an event when the merged browser window 510 or other application windows 540, 550 are altered, for example moved to a different location in the HVD display, altered in size, occluded by another window, etc., which may result from user actions such as clicking on different application windows, using keyboard navigation commands to move from application window-to-window, moving or resizing one or more windows, etc. For a geometry change event, the HVD browser extension in step 1144 sends an "update geometry" message to the endpoint browser server 362, which contains the current tab identifier, the window geometry, which may comprise window coordinates and size for the frameless client browser window 535, and information about what sections of the frameless client browser window 535 are occluded, etc. The HVD browser extension then returns to step 1104.

A delete tab event is an event when a tab in the browser is closed, which may result from user actions such as clicking on a "tab close" control, etc. For a delete tab event, the HVD browser extension in step 1146 determines if the current tab is being rendered by the endpoint, if yes proceeds to step 1148 and if no returns to step 1104 (because the host web browser will delete the tab). In step 1148, the HVD browser extension sends a "destroy browser" message containing the current tab identifier to the endpoint browser server 362, and returns to step 1104.

Figure 13A:
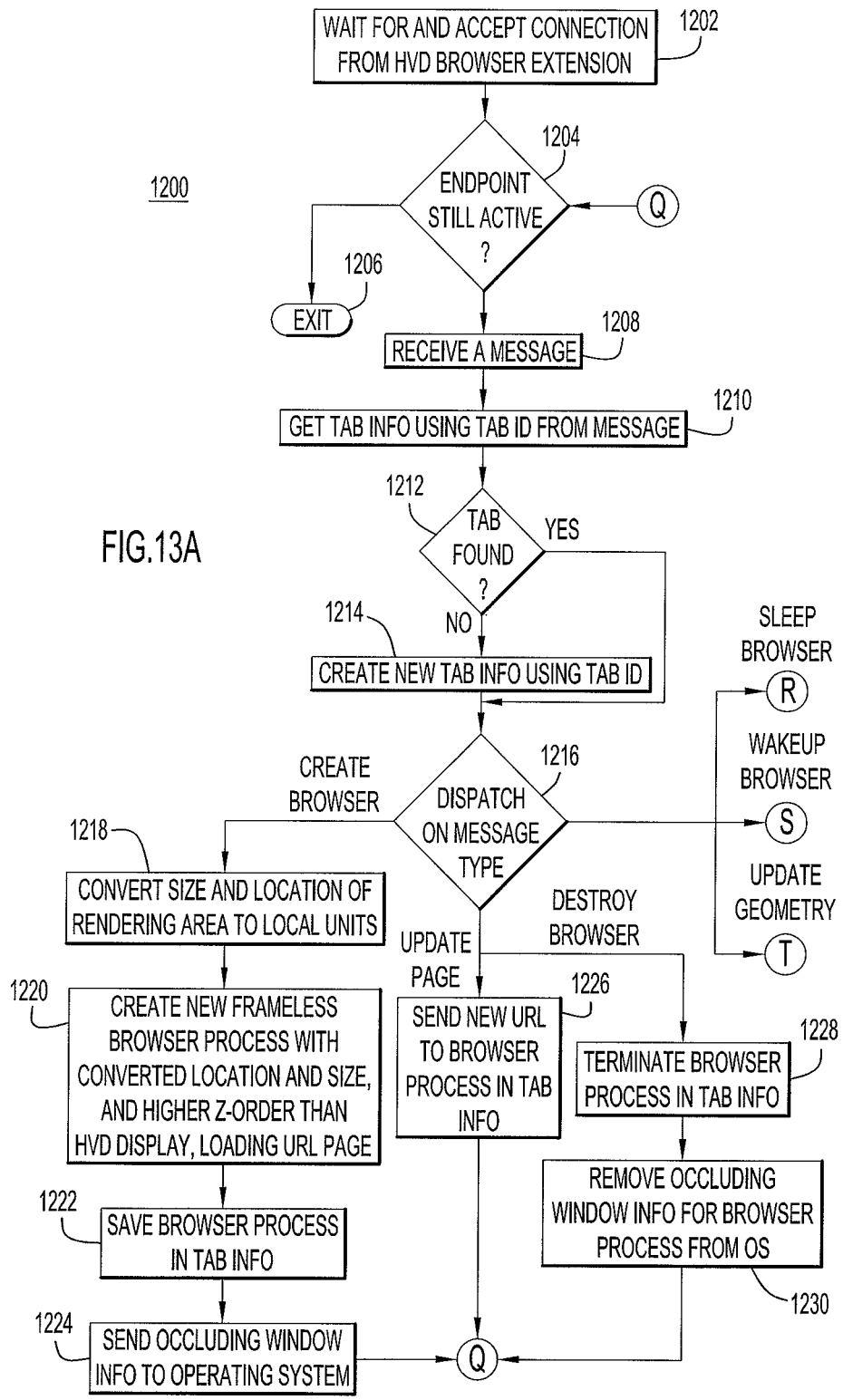
FIGS. 13A and 13B are an example of a flow chart generally depicting operation of an endpoint browser server at the client endpoint device with respect to an example embodiment in which a frameless endpoint browser is implemented.
Figure 13B:
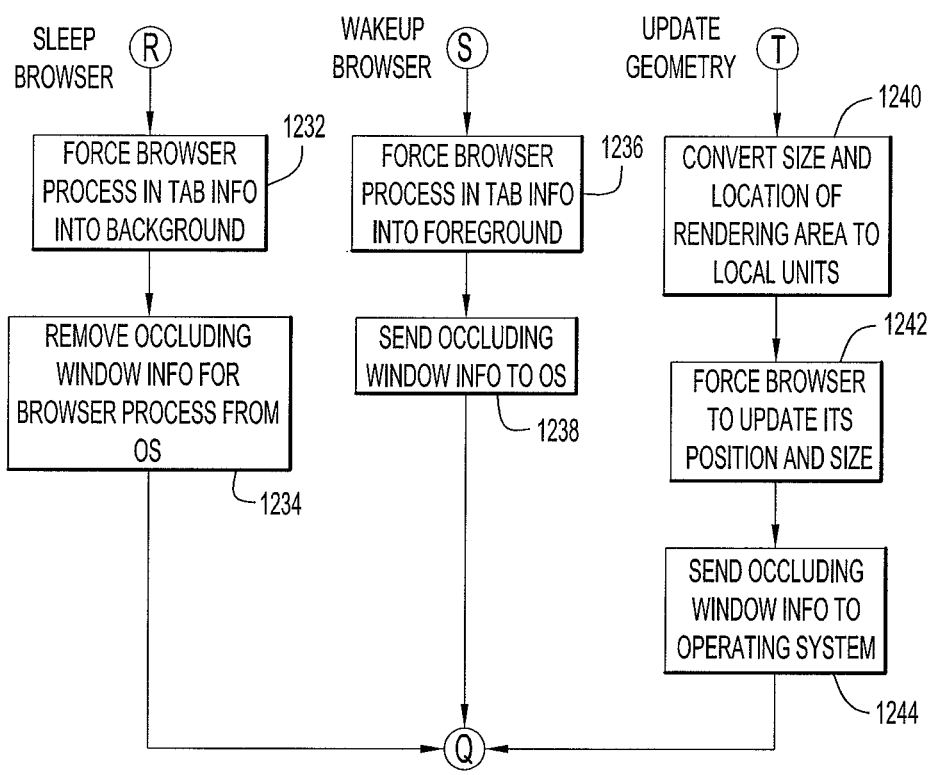

Referring now to FIGS. 13A and 13B, endpoint server process 1200 starts in step 1202 by the endpoint browser server 362 waiting for and accepting the establishment of communication session 390 by the HVD browser extension. It will be understood that, even if no frameless endpoint browser instances 360 are currently active, process 1200 should still be active to listen for incoming connection requests from HVD browser extensions 324. In one embodiment, process 1200 is started as part of the bootstrap process for client endpoint device 205, and remains active throughout the period that client endpoint device 205 is operational. In step 1204 the endpoint browser server determines if the endpoint device 205 is active, e.g., is connected to a host via a VDI session, etc. If not, the process 1200 ends at step 1206, e.g., by terminating process 1200 or returning to wait for the endpoint device 205 to become active, but if yes, then in step 1208 the endpoint browser server waits to receive a message from the HVD browser extension, for example one of the messages sent by HVD extension process 1100. When a message is received, the endpoint browser server proceeds to step 1210, where it locates the tab information based on the tab identifier in the message. In step 1212 the endpoint browser server looks for the identified tab, and if none is found, creates new tab information using the received tab identifier in step 1214, before proceeding to step 1216. If the identified tab is found, then the endpoint browser server proceeds to step 1216. In step 1216, the endpoint browser server processes the received message according to its type, before returning to step 1204.

For a "create browser" message, the endpoint browser server in step 1218 converts the window coordinates and size contained in the message to coordinates suitable for the display 250 associated with client endpoint device 205. In step 1220, the endpoint browser server creates a new instance of the frameless endpoint browser 360, which renders the new URL in a frameless browser window 535, that is, a drawing rectangle or a window with no framing decorations associated with it, as specified according to the received message. The frameless browser window 535 has a higher z-order than the HVD browser window 510, which in turn may be a portion of, for example, HVD display 500 (separately received by the client endpoint device 205, for example via VDI session 370). In step 1222 the endpoint browser server saves the frameless browser instance reference (in some embodiments, a process or thread identifier) in the tab information, thereby forming an association between the tab identifier and the browser instance reference, and in step 1224 sends information about regions of the HVD display that occlude the frameless browser window 535 to the endpoint operating system 355. In sum, the drawing rectangle and occlusion information allows endpoint browser server 362 to interact with operating system 355 to display only those portions of the rendered data that are currently visible in the HVD display, resulting in a endpoint display similar to that depicted in FIG. 6A as element 507a. The endpoint browser server then returns to step 1204.

For an "update page" message, the endpoint browser server in step 1226 sends the new URL to the endpoint browser instance associated with the received tab identifier, and returns to step 1204. For a "destroy browser" message, the endpoint browser server in step 1228 terminates the endpoint browser instance associated with the received tab identifier, and in step 1230 removes the occluding window information for this browser instance from the endpoint operating system 355, and returns to step 1204. Turning now to FIG. 13B, for a "sleep browser" message, the endpoint browser server in step 1232 forces the endpoint browser instance associated with the received tab identifier into the background, where it stops rendering data and remains minimized ("asleep"). In step 1234 the endpoint browser server removes the occluding window information for this browser instance from the endpoint operating system 355, and returns to step 1204.

For a "wakeup browser" message, the endpoint browser server in step 1236 restores the endpoint browser instance associated with the received tab identifier into the foreground, causing it to recommence rendering data on the endpoint display, and in step 1238 sends information about occluding regions of the HVD display to the endpoint operating system 355. The endpoint browser server then returns to step 1204. For an "update geometry" message, the endpoint browser server in step 1240 converts the window coordinates and size contained in the message to coordinates suitable for the display 250 associated with client endpoint device 205, and in step 1242 forces the frameless endpoint browser instance associated with the received tab identifier to update its position and size. In step 1244 the endpoint browser server sends information about occluding regions of the HVD display to the endpoint operating system 355, and returns to step 1204.

The above description is intended by way of example only. The description has been presented for purposes of illustration and description, but is not intended to be exhaustive or limited to the embodiments in the form disclosed. Many modifications and variations will be apparent to those of ordinary skill in the art.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

With respect to the Figures, which illustrate the architecture, functionality, and operation of possible implementations of methods, apparatuses, and computer readable media encoded with instructions, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   establishing a Virtual Desktop Interface (VDI) session between a client endpoint device and a Hosted Virtual Desktop (HVD) host;
   establishing an endpoint browser service on the client endpoint device;
   receiving from the HVD host at the client endpoint device a Hosted Virtual Desktop (HVD) display comprising an HVD browser window, the HVD browser window comprising one or more browser window elements, wherein web browsing is being performed at the HVD host;
   receiving, by the endpoint browser service, first browser synchronization data from the HVD host;
   detecting that the VDI session is inactive;
   in response to detecting the inactive VDI session, the endpoint browser service launching an endpoint browser instance at the client endpoint device; and
   utilizing, by the endpoint browser instance, the first browser synchronization data to display an endpoint browser window comprising the one or more browser window elements, thereby switching web browsing from the HVD host to the client endpoint device to provide seamless browsing.

2. The method of claim 1, wherein the VDI session is inactive because of a failure to maintain the VDI session.

3. The method of claim 1, wherein the first browser synchronization data comprises one or more types of data selected from the group consisting of data describing the currently open browser tabs and windows, browser configuration data, bookmark data, cookie data, certificate data, user profile configuration data, and browser history data.

4. The method of claim 1, further comprising:
   detecting that the VDI session has been re-established;
   in response to detecting the re-established VDI session, sending, by the endpoint browser service, second browser synchronization data to the HVD host;
   receiving at the client endpoint device a new HVD display comprising a new HVD browser window; and
   terminating the endpoint browser instance.

5. The method of claim 4, wherein the VDI session has been re-established because a failure to maintain the VDI session has been repaired.

6. The method of claim 4, wherein the second browser synchronization data comprises one or more types of data selected from the group consisting of data describing the currently open browser tabs and windows, browser configuration data, bookmark data, cookie data, certificate data, user profile configuration data, and browser history data.

7. The method of claim 1, further comprising:
   at the client endpoint device, merging endpoint-specific configuration information with the first browser synchronization data.

8. The method of claim 7, wherein the endpoint-specific configuration information comprises proxy settings.

9. The method of claim 1, further comprising downloading one or more files to a temporary storage area while the VDI session is inactive.

10. The method of claim 9, further comprising:
    detecting that the VDI session has been re-established; and
    in response to detecting the re-established VDI session, transferring the one or more files from the temporary storage area to a file storage area attached to the HVD host.

11. The method of claim 1, wherein the HVD browser window further comprises at least one placeholder element where an endpoint-provided frameless window may be rendered, and further comprising:
    creating, by the endpoint browser service, a frameless endpoint browser instance;
    receiving data from a web content server at the frameless endpoint browser instance; and
    generating a client endpoint display by rendering the HVD display and by the frameless endpoint browser instance rendering the received data in a frameless window in place of the at least one placeholder element of the HVD display; and
    in response to detecting the inactive VDI session, receiving data from the web content server at the endpoint browser instance, and the endpoint browser service configuring the endpoint browser window to render the received data.

12. The method of claim 11, further comprising:
    terminating the frameless endpoint browser instance.

13. The method of claim 11, further comprising:
    putting the frameless endpoint browser instance to sleep, so that the frameless endpoint browser instance remains active on the client endpoint device but no longer renders the frameless window while the VDI session remains inactive.

14. The method of claim 13, further comprising:
    detecting that the VDI session has been re-established;
    in response to detecting the re-established VDI session, sending, by the endpoint browser service, second browser synchronization data to the HVD host;
    awakening, by the endpoint browser service, the minimized frameless endpoint browser instance;
    receiving data from the web content server at the awakened frameless endpoint browser instance;
    generating a client endpoint display by rendering the HVD display and by the awakened frameless endpoint browser instance rendering the received data in a frameless window in place of the at least one placeholder element of the new HVD display; and
    terminating the endpoint browser instance.

15. The method of claim 11, further comprising:
    detecting that the VDI session has been re-established;
    in response to detecting the re-established VDI session, sending, by the endpoint browser service, second browser synchronization data to the HVD host;
    creating, by the endpoint browser service, a new frameless endpoint browser instance;
    receiving data from the web content server at the new frameless endpoint browser instance;
    generating a client endpoint display by rendering the HVD display and by the new frameless endpoint browser instance rendering the received data in a frameless window in place of the at least one placeholder element of the new HVD display; and terminating the endpoint browser instance.

16. The method of claim 1, wherein the one or more browser window elements includes at least two tabs, each tab associated with a web page rendering area.

17. A method comprising:

establishing a host web browser on a Hosted Virtual Desktop (HVD) host;

establishing a Virtual Desktop Interface (VDI) session between the HVD host and a client endpoint device;

generating an HVD display comprising an HVD browser window, the HVD browser window comprising one or more host-provided browser window elements, wherein web browsing is being performed at the HVD host;

sending the HVD display to the client endpoint device using the VDI session;

sending first browser synchronization data to the client endpoint device;

detecting that the VDI session is inactive, and in response to detecting the inactive VDI session, switching web browsing from the HVD host to the client endpoint device;

detecting that the VDI session has been re-established;

in response to detecting the re-establishment of the VDI session, receiving second browser synchronization data from the client endpoint device;

utilizing, by the host web browser, the second browser synchronization data to generate a new HVD display comprising a new HVD browser window, the new HVD browser window comprising one or more host-provided browser window elements; and sending the new HVD display to the client endpoint device using the VDI session, thereby switching web browsing from the client endpoint device to the HVD host.

18. The method of claim 17, wherein the HVD browser window further comprises at least one placeholder element where a client-provided frameless window may be rendered.

19. The method of claim 17, wherein the VDI session has been re-established because a failure to maintain the VDI session has been repaired.

20. The method of claim 17, wherein the first browser synchronization data comprises one or more types of data selected from the group consisting of data describing the currently open browser tabs and windows, browser configuration data, bookmark data, cookie data, certificate data, user profile configuration data, and browser history data.

21. An apparatus comprising:

a display device;

a web content server; and a processor configured to:

establish a Virtual Desktop Interface (VDI) session with a Hosted Virtual Desktop (HVD) host;

establish an endpoint browser service;

receive from the HVD host a Hosted Virtual Desktop (HVD) display comprising an HVD browser window, the HVD browser window comprising one or more browser window elements, wherein web browsing is being performed at the HVD host;

receive, by the endpoint browser service, first browser synchronization data from the HVD host;

detect that the VDI session is inactive;

in response to detecting the inactive VDI session, launch, by the endpoint browser service, an endpoint browser instance; and utilize, by the endpoint browser instance, the first browser synchronization data to display an endpoint browser window comprising the one or more browser window elements, thereby switching web browsing from the HVD host to the client endpoint device to provide seamless browsing.

22. The apparatus of claim 21, wherein the web content server is selected from the group consisting of a content source server and a content cache server.

23. The apparatus of claim 21, wherein the apparatus is selected from the group consisting of a thin client and a personal computer.

24. The apparatus of claim 21, wherein the processor is further configured to:

detect that the VDI session has been re-established;

in response to detecting the re-established VDI session, send, by the endpoint browser service, second browser synchronization data to the HVD host;

receive at the apparatus a new HVD display comprising a new HVD browser window; and terminate the endpoint browser instance.

25. One or more non-transitory computer readable media encoded with instructions that, when executed by a processor, cause the processor to:

establish a Virtual Desktop Interface (VDI) session between a client endpoint device and a Hosted Virtual Desktop (HVD) host;

establish an endpoint browser service on the client endpoint device;

receive from the HVD host at the client endpoint device a Hosted Virtual Desktop (HVD) display comprising an HVD browser window, the HVD browser window comprising one or more browser window elements, wherein web browsing is being performed at the HVD host;

receive, by the endpoint browser service, first browser synchronization data from the HVD host;

detect that the VDI session is inactive;

in response to detecting the inactive VDI session, launch, by the endpoint browser service, an endpoint browser instance at the client endpoint device; and utilize, by the endpoint browser instance, the first browser synchronization data to display an endpoint browser window comprising the one or more browser window elements, thereby switching web browsing from the HVD host to the client endpoint device to provide seamless browsing.

* * * * *